US009221936B2

(12) United States Patent
Kuo et al.

(10) Patent No.: US 9,221,936 B2
(45) Date of Patent: Dec. 29, 2015

(54) CONTINUITY ADDITIVE FOR POLYOLEFIN POLYMERIZATION PROCESSES

(71) Applicant: Univation Technologies, LLC, Houston, TX (US)

(72) Inventors: Chi-I Kuo, Humble, TX (US); Ghanshyam Ganu H. Patel, Sugar Land, TX (US); R. Eric Pequeno, Baytown, TX (US); Bruce J. Savatsky, Kingwood, TX (US); F. David Hussein, Cross Lanes, WV (US)

(73) Assignee: Univation Technologies, LLC, Houston, TX (US)

( * ) Notice: Subject to any disclaimer, the term of this patent is extended or adjusted under 35 U.S.C. 154(b) by 0 days.

(21) Appl. No.: 14/368,595

(22) PCT Filed: Dec. 18, 2012

(86) PCT No.: PCT/US2012/070281
§ 371 (c)(1),
(2) Date: Jun. 25, 2014

(87) PCT Pub. No.: WO2013/101541
PCT Pub. Date: Jul. 4, 2013

(65) Prior Publication Data
US 2014/0350199 A1    Nov. 27, 2014

Related U.S. Application Data

(60) Provisional application No. 61/582,321, filed on Dec. 31, 2011.

(51) Int. Cl.
| C08F 2/34 | (2006.01) |
| C08F 2/44 | (2006.01) |
| C08F 4/609 | (2006.01) |
| C08F 4/6192 | (2006.01) |
| C08F 4/626 | (2006.01) |
| C08F 210/16 | (2006.01) |
| C08F 10/02 | (2006.01) |

(52) U.S. Cl.
CPC ............... *C08F 210/16* (2013.01); *C08F 10/02* (2013.01)

(58) Field of Classification Search
USPC ......... 526/86, 90, 141, 74; 502/123, 155, 167
See application file for complete search history.

(56) References Cited

U.S. PATENT DOCUMENTS

| 4,640,906 A * | 2/1987 | Terano et al. ................. 502/104 |
| 2005/0148742 A1 | 7/2005 | Hagerty et al. |
| 2005/0282980 A1 | 12/2005 | Szul et al. |
| 2007/0049711 A1 | 3/2007 | Kuo et al. |

FOREIGN PATENT DOCUMENTS

| CA | 1279945 | * | 2/1991 |
| EP | 0192987 | | 9/1986 |
| GB | 2183244 | | 6/1987 |
| WO | WO 2005/044863 | | 5/2005 |

OTHER PUBLICATIONS

Chemicalland21 Product Identification Sheet: 2,2,6,6-Tetramethylpiperidine, 3 pages (Undated).*

* cited by examiner

*Primary Examiner* — Fred M Teskin
(74) *Attorney, Agent, or Firm* — Brooks, Cameron & Huebsch, PLLC

(57) ABSTRACT

A polymerization process is disclosed, including: polymerizing an olefin to form an olefin-based polymer in a polymerization reactor; and introducing a hindered amine light stabilizer to the polymerization reactor. The process may further comprise monitoring static in the polymerization reactor; maintaining the static at a desired level by use of a hindered amine light stabilizer, the hindered amine light stabilizer present in the reactor in the range from about 0.1 to about 500 ppmw, based on the weight of polymer produced by the process.

19 Claims, 1 Drawing Sheet

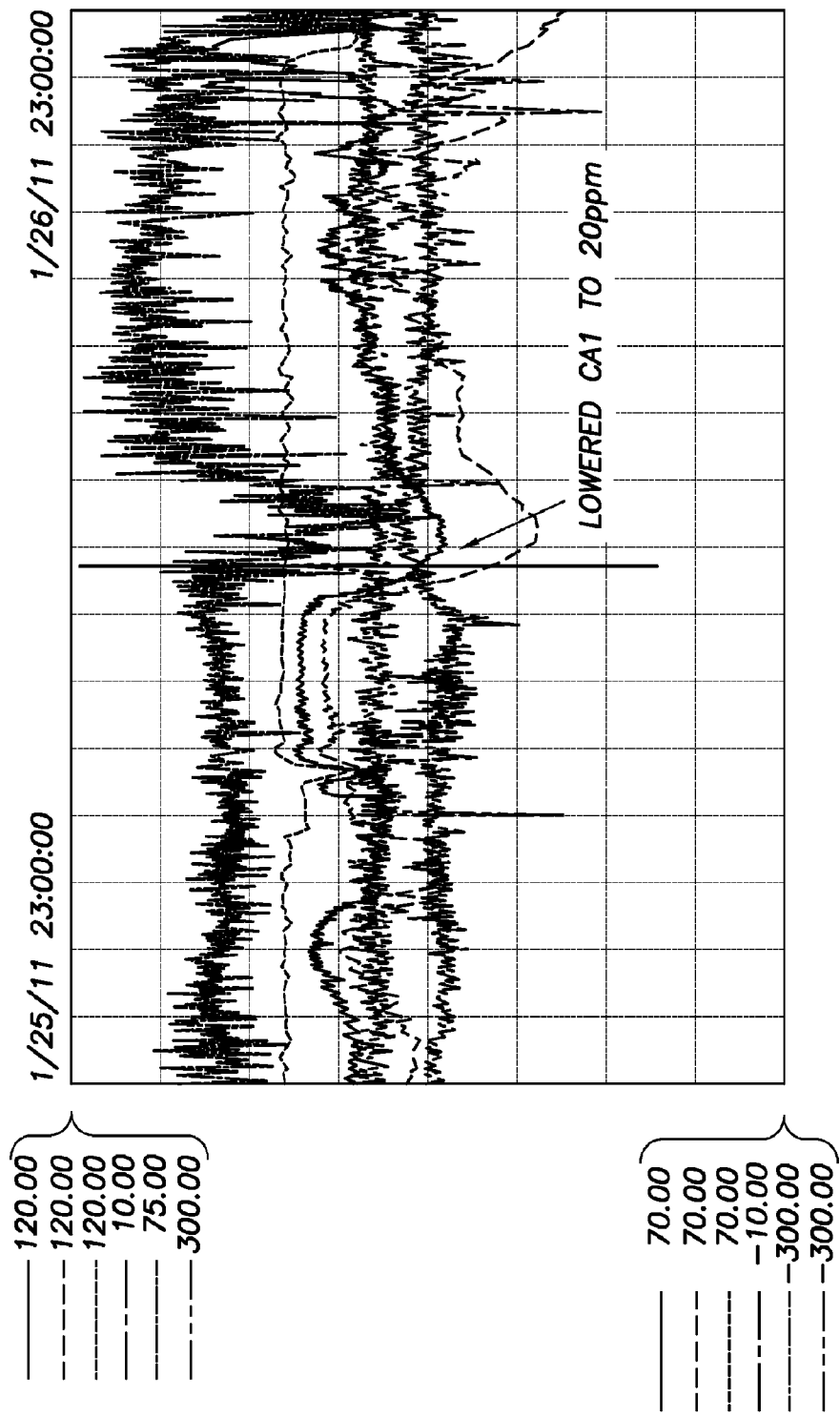

CONTINUITY ADDITIVE FOR POLYOLEFIN POLYMERIZATION PROCESSES

CROSS-REFERENCE TO RELATED APPLICATIONS

This application is a National Stage application under 35 U.S.C. §371 of International Application No. PCT/US2012/70281, filed Dec. 18, 2012, that claims the benefit of Ser. No. 61/582,321, filed Dec. 31, 2011, the disclosures of which are incorporated by reference in their entireties.

BACKGROUND

Metallocene catalysts allow the production of polyolefins with unique properties such as narrow molecular weight distributions and narrow chemical compositions. These properties in turn result in improved structural performance in products made with the polymers, such as greater impact strength and clarity in films. While metallocene catalysts have yielded polymers with improved characteristics, they have presented drawbacks when used in traditional polymerization systems. For instance, when metallocene catalysts are used in fluidized bed reactors, drawbacks include sheeting and the related phenomena drooling.

Various methods for controlling sheeting have been developed. Such methods typically involve monitoring the static charges near the reactor wall in regions where sheeting is known to develop and introducing a static control agent into the reactor when the static levels fall outside a predetermined range. A positive charge generating additive is used if the static charge is negative, and a negative charge generating additive is used if the static charge is positive. Drawbacks to such monitoring methods include inefficiencies when used with metallocene catalysts.

Further drawbacks to metallocene catalysts when used with polymerization systems include reactor discontinuity problems. Techniques have been developed to overcome such drawbacks such as coating the polymerization equipment, controlling the polymerization rate, particularly on start-up, and reconfiguring the reactor design and injecting various agents into the reactor. Such techniques also have various drawbacks such as inefficiencies.

Continuity additives have been developed to overcome such deficiencies. However, conventional continuity additives also have drawbacks. Such drawbacks may include reduced catalyst productivity.

Consequently, there is a need for improved methods for improving polymerization processes. There are also needs for improving catalyst and reactor performance.

SUMMARY

Disclosed herein are a polymerization process that may comprise polymerizing an olefin to form an olefin-based polymer in a polymerization reactor; and introducing a hindered amine light stabilizer to the polymerization reactor.

Further disclosed herein are a process for copolymerizing ethylene and an alpha olefin in a gas phase reactor. For example, the process for copolymerizing ethylene and an alpha olefin may comprise utilizing a metallocene catalyst, activator and support, comprising: combining reactants comprising ethylene and a monomer selected from the group consisting of 1-butene, 1-hexene, 4-methylpent-1-ene, 1-octene, and any combination thereof in the presence of a metallocene catalyst, an activator and a support; monitoring static in the gas phase reactor by a probe selected from the group consisting of a recycle line static probe, an upper bed static probe, an annular disk static probe, a distributor plate static probe, and any combination thereof; maintaining the static at a desired level by use of a hindered amine light stabilizer, the hindered amine light stabilizer present in the gas phase reactor in the range from about 0.01 to about 500 ppmw, based on the weight of polymer produced in the process.

Further disclosed herein are a catalyst system that may comprise a polymerization catalyst and a hindered amine light stabilizer.

BRIEF DESCRIPTION OF THE DRAWINGS

For a detailed description of the preferred embodiments of the invention, reference will now be made to the accompanying drawing in which the FIGURE illustrates static and skin thermocouple activities.

DETAILED DESCRIPTION

Before the present compounds, components, compositions, and/or methods are disclosed and described, it is to be understood that unless otherwise indicated this invention is not limited to specific compounds, components, compositions, reactants, reaction conditions, ligands, metallocene structures, or the like, as such may vary, unless otherwise specified. It is also to be understood that the terminology used herein is for the purpose of describing particular embodiments only and is not intended to be limiting.

It must also be noted that, as used in the specification and the appended claims, the singular forms "a," "an" and "the" include plural referents unless otherwise specified.

Embodiments disclosed herein relate generally to use of hindered amine light stabilizers, such as those for the production of ethylene- and propylene-based polymers. More specifically, embodiments disclosed herein relate to the use of hindered amine light stabilizers to control static levels and/or reduce resin and adhesion of catalyst particles in a polymerization reactor during the production of ethylene- or propylene-based polymers. Such additives may be useful, for example, where the polymerization is catalyzed with a metallocene catalyst. The hindered amine light stabilizers and/or mixtures of the hindered amine light stabilizers and aluminum distearate may be added to a polymerization reactor to control static levels in the reactor, preventing, reducing, or reversing sheeting, drooling and other discontinuity events resulting from excessive static levels.

Hindered Amine Light Stabilizer Continuity Additives

The continuity additive comprises a hindered amine light stabilizer (i.e., HALS). A hindered amine light stabilizer may include a hindered amine. As used herein, the term "hindered amine" refers to a chemical compound comprising an amine functional group surrounded by a crowded steric environment. Hindered amine light stabilizers comprise derivatives of 2,2,6,6-tetramethyl piperidine.

The hindered amine light stabilizer comprises any molecular weight suitable for use with metallocene catalysts. In an embodiment, the hinder amine light stabilizer comprises a molecular weight of from about 100 g/mole to about 10,000 g/mole, or from about 2,000 g/mole to about 3,100 g/mole. Without being limited by theory, hindered amine light stabilizers with too low of a molecular weight may reduce the activity of the metallocene catalysts to an inefficient level. Further, without being limited by theory, hindered amine light stabilizers with too high of a molecular weight may not have an efficient dispersion.

In embodiments, the hindered amine light stabilizer comprises poly[[6-[(1,1,3,3-tetramethylbutyl)amino]-1,3,5-triazine-2,4-diyl][2,2,6,6-tetramethyl-4-piperidinyl)imino]-1,6-hexanediyl[2,2,6,6-tetramethyl-4-piperidinyl)imino]]); poly[[6-(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]]; 1,3,5-trizine-2,4,6-triamine; N'N'''-(ethanediylbis-(4,6-bis-(butyl(1,2,2,6,6-pentamethyl-4-piperidinyl-amino)-1,3,5-trizine-2-yl)-iminopropanedil)-N',N'''-dibutyl-N',N''-bis-(1,2,2,6,6-pentamethyl-4-piperidinyl); poly-methylpropyl-3-oxy-4-(2,2,6,6-tetramethyl-piperidinyl-siloxane; octa-decene-(N-(2,2,6,6-tetramethylpiperidinyl-4-N-maleic imido oxalic acid diamide) copolymer; poly-(6-morpholine-S-trizine-2,4-diyl)-2,2,6,6-tetramethyl-4-piperidinyl)-hexa-methylene-2,2,6,6-tetramethyl-4-piperidinyl)-imino; 1,6-Hexanediamine, N,N'-bis(2,2,6,6-tetramethyl-4-piperidinyl)-polymer with 2,3,6-trichloro-1,3,5-triazine, reaction products with, N-butyl-1-butanamine and N-butyl-2,2,6,6-tetramethyl-4-piperidinamine; or any combinations thereof. In an embodiment, the hindered amine light stabilizer comprises poly[[6-[(1,1,3,3-tetramethylbutyl)amino]-1,3,5-triazine-2,4-diyl][2,2,6,6-tetramethyl-4-piperidinyl)imino]-1,6-hexanediyl[2,2,6,6-tetramethyl-4-piperidinyl)imino]]); poly[[6-[(1,1,3,3-tetramethylbutyl)amino]-s-triazine-2,4-diyl]-[(2,2,6,6-tetramethyl-4-piperidyl)imino]-hexamethylene-[(2,2,6,6-tetramethyl-4-piperidyl)imino]]; 1,6-Hexanediamine, N,N'-bis(2,2,6,6-tetramethyl-4-piperidinyl)-polymer with 2,3,6-trichloro-1,3,5-triazine, reaction products with, N-butyl-1-butanamine and N-butyl-2,2,6,6-tetramethyl-4-piperidinamine; or any combinations thereof. In embodiments, the hindered amine light stabilizer comprises poly[[6-[(1,1,3,3-tetramethylbutyl)amino]-1,3,5-triazine-2,4-diyl][2,2,6,6-tetramethyl-4-piperidinyl)imino]-1,6-hexanediyl[2,2,6,6-tetramethyl-4-piperidinyl)imino]]).

In an embodiment, the hindered amine light stabilizer comprises the following formula:

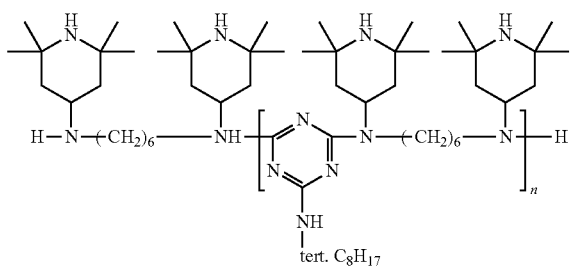

wherein n comprises molecular weight. In some embodiments, NH-tert. $C_8H_{17}$ of the formula is replaced by N—R, wherein R comprises an alkyl aromatic. Without limitation, commercial examples of the hindered amine light stabilizer include BLS® (which is a registered trademark of Mayzo, Inc.), CHIMASSORB® 944 and 2020 (which is a registered trademark of Ciba Corporation).

In addition to charge characteristics, the hindered amine light stabilizer may adhere to various surfaces, such as metals. Thus, when added to a polymerization reactor, the hindered amine light stabilizer may form a thin film coating the reactor walls and other portions of the reactor, such as the surface of feed lines, recycle lines, and other exposed surfaces in the reactor. Such coatings may prevent sheeting of polymer on such surfaces, and in some embodiments may reverse sheeting that may have previously occurred.

The hindered amine light stabilizer may also be reactive with various oxygenates. Thus, the hindered amine light stabilizer may additionally function as a scavenger for compounds that may poison active catalyst sites. Thus, without limitation, in contrast to traditional static control agents having hydroxyl groups that may poison catalysts, the hindered amine light stabilizer may, for example, enhance catalyst activity by scavenging catalyst poisons, in addition to the static control and reactor coating functions.

The hindered amine light stabilizer may be fed to polymerization reactors as a solution or as a slurry, thus providing an effective transport medium. In an embodiment, the hindered amine light stabilizer may be fed to polymerization reactors as a solution. For example, the hindered amine light stabilizer may be initially admixed or combined with a liquid. In embodiments, the liquid is a mineral oil, which forms a slurry that may be fed to the polymerization reactor. In other embodiments, the hindered amine light stabilizer may be admixed or combined with an aliphatic or aromatic hydrocarbon solvent (i.e., liquid), prior to being fed to the reactor. In embodiments, the hindered amine light stabilizer is a solution or a slurry that is added to the reactor and comprises a hindered amine light stabilizer and a liquid selected from the group consisting of a mineral oil, an aromatic hydrocarbon, an aliphatic hydrocarbon, and any combination thereof. The hindered amine light stabilizer may also be added to the reactor in its pure or neat form without any additional admixture component. In some embodiments, the hindered amine light stabilizer may be admixed with aluminum distearate and mineral oil to form a slurry prior to being fed to the reactor.

In some embodiments, the hindered amine light stabilizer may be combined/admixed with a polymerization catalyst prior to feeding both to a polymerization reactor. In other embodiments, the polymerization catalyst and the hindered amine light stabilizer may be fed to the polymerization reactor separately. In an embodiment, a combined feed of a polymerization catalyst and a hindered amine light stabilizer may be fed to the reactor in combination with separate addition of the hindered amine light stabilizer to the reactor. When fed to the reactor as a combined feed, such catalyst/hindered amine light stabilizer combinations or mixtures may be formed in a feed vessel or mixed within feed lines during transport to the reactor.

The amount of the hindered amine light stabilizer added to the reactor system may depend upon the catalyst system used, as well as reactor pre-conditioning (such as coatings to control static buildup) and other factors known to those of ordinary skill in the art. In some embodiments, the hindered amine light stabilizer may be added to the reactor in an amount ranging from about 0.01 parts per million by weight ("ppmw") to about 500 ppmw based on the polymer production rate (usually expressed as pounds or kilograms per unit of time). In other embodiments, the hindered amine light stabilizer may be added to the reactor in an amount ranging from about 0.01 ppmw to about 500 ppmw, from about 0.05 ppmw to about 100 ppmw, from about 1 ppmw to about 50 ppmw, or from about 5 ppmw to about 50 ppmw. In other embodiments, the hindered amine light stabilizer may be added to the reactor in an amount of about 0.01 ppmw or greater, based on the polymer production rate. Other suitable ranges for the hindered amine light stabilizer, based on the polymer production weight include lower limits of greater than or equal to 0.01, 0.02, 0.05, 0.1, 0.5, 1, 2, 3, 4, 5, 10, 12, 15 and upper limits of less than or equal to 500, 400, 300, 200, 150, 100, 75, 50, 40, 30, 25, 20, where the ranges are bounded by any lower and upper limit described above. Embodiments may include a mixture of hindered amine light stabilizer.

The hindered amine light stabilizer may be combined/admixed with the polymerization catalyst composition prior to feeding to the polymerization reactor. The hindered amine light stabilizer may be present in the catalyst composition/system at from about 0.1 to about 25 wt %. Within this range, the hindered amine light stabilizer may be present in the catalyst composition/system at greater than or equal to about 0.5%, or greater than or equal to about 1%, or greater than or equal to about 2%, or greater than or equal to about 3%, or greater than or equal to about 4%, or greater than or equal to about 5%, or greater than or equal to about 6%, or greater than or equal to about 7%, or greater than or equal to about 8%, or greater than or equal to about 9%, or greater than or equal to about 10%, based on the total weight of the catalyst composition. Also within this range, the hindered amine light stabilizer may be present in the catalyst composition/system alternatively at less than or equal to about 20%, or less than or equal to about 15%, or less than or equal to about 10%, based on the total weight of the catalyst composition/system.

The hindered amine light stabilizer may be used as or in a reactor coating emplaced during or prior to conducting polymerization reactions within the reactor. Various methods for use of a continuity additive in reactor coatings or during polymer production are described in, for example, WO 2008/108913, WO 2008/108931, WO 2004/029098, U.S. Pat. Nos. 6,335,402, 4,532,311, and U.S. Patent Appl. Pub. No. 2002/026018. For instance, at least one of a bed wall, a distributor plate, and a gas recycle line of a polymerization reactor may be contacted with a hindered amine light stabilizer to form a coating thereupon. Formation of the coating prior to conducting polymerization reactions within the reactor may reduce or prevent formation of sheets in the reactor system during subsequent polymerization reactions. Further, such a coating may be sufficient to allow the polymerization reactions to be conducted in the absence of any added continuity additive or static control agents without significant formation of sheets within the reactor. Continuity additives and static control agents may, of course, be fed to the coated reactor, if desired. As used herein "the absence of any added continuity additive or static control agents" means that no continuity additives or static control agents (other than the hindered amine light stabilizers that may function as continuity additives or static control agents) have been intentionally added to the reactor, and if present at all are present in the reactor at less than about 0.02 ppmw, or less than about 0.01 ppmw, or less than about 0.005 ppmw, based on the polymer production rate.

The hindered amine light stabilizer may interact with the particles and other components in the fluidized bed, reducing or neutralizing static charges related to frictional interaction of the catalyst and polymer particles, reacting or complexing with various charge-containing compounds that may be present or formed in the reactor, as well as reacting or complexing with oxygenates and other catalyst poisons, as well as coating reactor wall and particles surfaces to reduce adhesion of particles to reactor wall.

Continuity Additives

In addition to the hindered amine light stabilizer, it may also be desired to use one or more additional continuity additives to aid in regulating static levels in the reactor. "Continuity additives" as used herein also include chemical compositions commonly referred to in the art as "static control agents." Due to the enhanced performance of the reactor systems and catalysts that may result via use of a hindered amine light stabilizer, the continuity additives may be used, for example, at a lower concentration in polymerization reactors as compared to use of the continuity additives alone. Thus, the impact the continuity additives have on catalyst productivity may not be as substantial when used in conjunction with hindered amine light stabilizers.

As used herein, a static control agent is a chemical composition which, when introduced into a fluidized bed reactor, may influence or drive the static charge (negatively, positively, or to zero) in the fluidized bed. The specific static control agent used may depend upon the nature of the static charge, and the choice of static control agent may vary dependent upon the polymer being produced and the catalyst being used. The use of static control agents is disclosed in European Patent No. 0229368 and U.S. Pat. No. 5,283,278.

For example, if the static charge is negative, then static control agents such as positive charge generating compounds may be used. Positive charge generating compounds may include MgO, ZnO, $Al_2O_3$, and CuO, for example. In addition, alcohols, oxygen, and nitric oxide may also be used to control negative static charges, for instance as disclosed in U.S. Pat. Nos. 4,803,251 and 4,555,370.

In some embodiments, when catalysts, such as, metallocene catalysts, are used in a fluidized bed reactor, additional continuity additives such as aluminum distearate may also be employed. Any additional continuity additive used may be selected for its ability to receive the static charge in the fluidized bed. Suitable additional continuity additives may also include aluminum distearate, a carboxylate metal salt, ethoxylated amines, and anti-static compositions such as those provided by Innospec Inc. under the trade name OCTASTAT. In embodiments, the hindered amine light stabilizer is introduced to the reactor in a composition comprising the hindered amine light stabilizer and an additional continuity additive selected from the group consisting of a carboxylate metal salt, an ethoxylated amine, and combinations thereof. For example, OCTASTAT 2000 is a mixture of a polysulfone copolymer, a polymeric polyamine, and oil-soluble sulfonic acid.

Any of the aforementioned continuity additives, as well as those described in, for example, WO 01/44322, listed under the heading Carboxylate Metal Salt and including those chemicals and compositions listed as antistatic agents may be employed either alone or in combination as a continuity additive. For example, the carboxylate metal salt may be combined with an amine containing control agent (e.g., a carboxylate metal salt with any family member belonging to the KEMAMINE® (a registered trademark of Crompton Corporation) or ATMER® (a registered trademark of Uniqema Americas LLC) family of products).

Regardless of which continuity additives are used, it is to be understood that care may be exercised in selecting an appropriate continuity additive to avoid introduction of poisons into the reactor. In addition, in selected embodiments, the smallest amount of the continuity additives sufficient to bring the static charge into alignment with the desired range may be used.

In some embodiments, continuity additives may be added to the reactor as a combination of two or more of the above listed continuity additives, or a combination of a continuity additive and a hindered amine light stabilizer. In other embodiments, the continuity additive(s) may be added to the reactor in the form of a solution or a slurry, and may be added to the reactor as an individual feed stream or may be combined with other feeds prior to addition to the reactor. For example, the continuity additive may be combined with the catalyst or catalyst slurry prior to feeding the combined catalyst-static control agent mixture to the reactor.

In some embodiments, the continuity additives may be added to the reactor in an amount ranging from about 0.05 to about 200 ppmw, based on the polymer production rate, or from about 2 to about 100 ppmw, or from about 2 to about 50 ppmw. In other embodiments, the continuity additives may be added to the reactor in an amount of about 2 ppmw or greater, based on the polymer production rate.

In some embodiments, a mixture of a hindered amine light stabilizer and a continuity additive may be fed to the reactor. In an embodiment, the weight ratio of the hindered amine light stabilizer to the additional continuity additive may be from about 95:5 to about 50:50. Other suitable weight ratios of the hindered amine light to the continuity additive may include a weight ratio of greater than or equal to about 60:40, about 70:30, about 80:20, or about 90:10.

Polymerization Process

Embodiments for producing polyolefins disclosed herein may employ any suitable process for the polymerization of olefins, including any suspension, solution, slurry, or gas phase process, using known equipment and reaction conditions, and are not limited to any specific type of polymerization system.

In general, the polymerization process may be a continuous gas phase process, such as a fluid bed process. In an embodiment, a fluid bed reactor may have a reaction zone and a velocity reduction zone (i.e., disengagement zone). The reaction zone includes a bed of growing polymer particles, formed polymer particles and a minor amount of catalyst particles fluidized by the continuous flow of the gaseous monomer and diluent to remove heat of polymerization through the reaction zone. Optionally, some of the recirculated gases may be cooled and compressed to form liquids that increase the heat removal capacity of the circulating gas stream when readmitted to the reaction zone. A suitable rate of gas flow may be readily determined by simple experiment. Makeup of gaseous monomer to the circulating gas stream is at a rate equal to the rate at which particulate polymer product and monomer associated therewith is withdrawn from the reactor, and the composition of the gas passing through the reactor is adjusted to maintain an essentially steady state gaseous composition within the reaction zone. The gas leaving the reaction zone is passed to the velocity reduction zone where entrained particles are removed. Finer entrained particles and dust may be removed in a cyclone and/or fine filter. The gas is passed through a heat exchanger wherein the heat of polymerization is removed, compressed in a compressor and then returned to the reaction zone.

Useful gas phase polymerization processes include those that utilize a fluidized bed reactor. This type reactor, and means for operating the reactor, are well known and are described in, for example, U.S. Pat. Nos. 3,709,853; 4,003,712; 4,011,382; 4,302,566; 4,543,399; 4,882,400; 5,352,749; 5,541,270; EP-A-0 802 202. These patents disclose gas phase polymerization processes wherein the polymerization medium is either mechanically agitated or fluidized by the continuous flow of the gaseous monomer and diluent.

The process described herein is suitable for the production of homopolymers of olefins, including ethylene, and/or copolymers, terpolymers, and the like, of olefins, including polymers comprising ethylene and at least one or more other olefins. The olefins may be alpha-olefins. The olefins, for example, may contain from 2 to 16 carbon atoms in one embodiment. In other embodiments, ethylene and a comonomer comprising from 3 to 12 carbon atoms, or from 4 to 10 carbon atoms, or from 4 to 8 carbon atoms, may be used. In an embodiment, the olefin is a monomer selected from the group consisting of ethylene, propylene, and any combination thereof.

In embodiments, polyethylene may be prepared by the process disclosed herein. Such polyethylene may include homopolymers of ethylene and interpolymers of ethylene and at least one alpha-olefin wherein the ethylene content is at least about 50% by weight of the total monomers involved. Olefins that may be used herein include ethylene, propylene, 1-butene, 1-pentene, 1-hexene, 1-heptene, 1-octene, 4-methylpent-1-ene, 1-decene, 1-dodecene, 1-hexadecene and the like. Also usable are polyenes such as 1,3-hexadiene, 1,4-hexadiene, cyclopentadiene, dicyclopentadiene, 4-vinylcyclohex-1-ene, 1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur.

The content of the alpha-olefin incorporated into the copolymer may be no greater than 30 mol % in total, or may be from 3 to 20 mol %. The term "polyethylene" when used herein is used generically to refer to any or all of the polymers comprising ethylene described above.

In other embodiments, propylene-based polymers may be prepared by processes disclosed herein. Such propylene-based polymers may include homopolymers of propylene and interpolymers of propylene and at least one alpha-olefin wherein the propylene content is at least about 50% by weight of the total monomers involved. Comonomers that may be used may include ethylene, 1-butene, 1-pentene, 1-hexene, 1-heptene, 1-octene, 4-methylpentene-1,1-decene, 1-dodecene, 1-hexadecene and the like. Also usable are polyenes such as 1,3-hexadiene, 1,4-hexadiene, cyclopentadiene, dicyclopentadiene, 4-vinylcyclohexene-1,1,5-cyclooctadiene, 5-vinylidene-2-norbornene and 5-vinyl-2-norbornene, and olefins formed in situ in the polymerization medium. When olefins are formed in situ in the polymerization medium, the formation of polyolefins containing long chain branching may occur. In one embodiment, the content of the alpha-olefin comonomer incorporated into a propylene-based polymer may be no greater than 49 mol % in total, from 3 to 35 mol % in other embodiments.

Hydrogen gas is often used in olefin polymerization to control the final properties of the polyolefin. Increasing the concentration (partial pressure) of hydrogen may increase the melt flow index (MFI) and/or melt index (MI) of the polyolefin generated. The MFI or MI can thus be influenced by the hydrogen concentration. The amount of hydrogen in the polymerization may be expressed as a mole ratio relative to the total polymerizable monomer, for example, ethylene, or a blend of ethylene and hexene or propylene. In an embodiment, the amount of hydrogen used in the polymerization processes is an amount sufficient to achieve the desired MFI or MI of the final polyolefin resin. Melt flow rate for polypropylene may be measured according to ASTM D 1238 (230° C. with 2.16 kg weight); melt index ($I_2$) for polyethylene may be measured according to ASTM D 1238 (190° C. with 2.16 kg weight).

Other gas phase processes contemplated include series or multistage polymerization processes. For example, a staged reactor employing two or more reactors in series may be used, wherein one reactor may produce, for example, a high molecular weight component and another reactor may produce a low molecular weight component. In some embodiments, the polyolefin is produced using a staged gas phase reactor. Such polymerization systems are described in, for example, U.S. Pat. Nos. 5,627,242; 5,665,818; and 5,677,375; and European publications EP-A-0 794 200; EP-B1-0 649 992, EP-A-0 802 202 and EP-B-634 421.

In one embodiment, the one or more reactors in a gas phase or fluidized bed polymerization process may have a pressure ranging from about 0.7 to about 70 bar (about 10 to about 1,000 psia), or from about 14 to about 42 bar (about 200 to about 600 psia). In one embodiment, the one or more reactors may have a temperature ranging from about 10° C. to about 150° C., or from about 40° C. to about 125° C. In an embodiment, the reactor temperature may be operated at the highest feasible temperature taking into account the sintering temperature of the polymer within the reactor. In embodiments, the superficial gas velocity in the one or more reactors may range from about 0.2 to about 1.1 meters/second (about 0.7 to about 3.5 feet/second), or from about 0.3 to about 0.8 meters/second (about 1.0 to about 2.7 feet/second).

Some embodiments may be used with gas phase polymerization systems, at superatmospheric pressures in the range from 0.07 to 68.9 bar (1 to 1,000 psig), from 3.45 to 27.6 bar (50 to 400 psig) in some embodiments, from 6.89 to 24.1 bar (100 to 350 psig) in other embodiments, and temperatures in the range from 30 to 130° C., or from 65 to 110° C., from 75 to 120° C. in other embodiments, or from 80 to 120° C. in further embodiments. In some embodiments, operating temperatures may be less than 112° C. In embodiments, stirred or fluidized bed gas phase polymerization systems may be used.

The polymerization process may be a continuous gas phase process that includes the steps of: (a) introducing a recycle stream (including ethylene and alpha olefin monomers) into the reactor; (b) introducing the supported catalyst system; (c) withdrawing the recycle stream from the reactor; (d) cooling the recycle stream; (e) introducing into the reactor additional monomer(s) to replace the monomer(s) polymerized; (f) reintroducing the recycle stream or a portion thereof into the reactor; and (g) withdrawing a polymer product from the reactor.

In embodiments, one or more olefins, $C_2$ to $C_{30}$ olefins or alpha-olefins, including ethylene or propylene or combinations thereof, may be prepolymerized in the presence of a metallocene catalyst system prior to the main polymerization. The prepolymerization may be carried out batch-wise or continuously in gas, solution or slurry phase, including at elevated pressures. The prepolymerization may take place with any olefin monomer or combination and/or in the presence of any molecular weight controlling agent such as hydrogen. For examples of prepolymerization procedures, see U.S. Pat. Nos. 4,748,221; 4,789,359; 4,923,833; 4,921, 825; 5,283,278; and 5,705,578 and European publication EP-B-0279 863 and WO 97/44371.

Any type of polymerization catalyst may be used, including liquid-form catalysts, solid catalysts, and heterogeneous or supported catalysts, among others, and may be fed to the reactor as a liquid, slurry (liquid/solid mixture), or as a solid (typically gas transported). Liquid-form catalysts useful in embodiments may be stable and sprayable or atomizable. These catalysts may be used alone or in various combinations or mixtures. For example, one or more liquid catalysts, one or more solid catalysts, one or more supported catalysts, or a mixture of a liquid catalyst and/or a solid or supported catalyst, or a mixture of solid and supported catalysts may be used. These catalysts may be used with co-catalysts, activators, and/or promoters well known in the art. Examples of suitable catalysts include:

A. Ziegler-Natta catalysts, including titanium-based catalysts, such as those described in U.S. Pat. Nos. 4,376,062 and 4,379,758. Ziegler-Natta catalysts are well known in the art, and typically are magnesium/titanium/electron donor complexes used in conjunction with an organoaluminum co-catalyst.

B. Chromium-based catalysts, such as those described in U.S. Pat. Nos. 3,709,853; 3,709,954; and 4,077,904.

C. Vanadium-based catalysts, such as vanadium oxychloride and vanadium acetylacetonate, such as described in U.S. Pat. No. 5,317,036.

D. Metallocene catalysts, such as those described in U.S. Pat. Nos. 6,933,258 and 6,894,131.

E. Cationic forms of metal halides, such as aluminum trihalides.

F. Cobalt catalysts and mixtures thereof, such as those described in U.S. Pat. Nos. 4,472,559 and 4,182,814.

G. Nickel catalysts and mixtures thereof, such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium. In embodiments, carboxylates, alcoholates, acetylacetonates, halides (including ether and alcohol complexes of neodymium trichloride), and allyl derivatives of such metals may be used. In various embodiments, neodymium compounds (such as neodymium neodecanoate, octanoate, and versatate) are rare earth metal catalysts that may be used. Rare earth catalysts may be used, for example, to polymerize butadiene or isoprene.

I. Any combination of one or more of the catalysts of the above.

Examples of suitable Ziegler-Natta catalyst compounds are disclosed in ZIEGLER CATALYSTS 363-386 (G. Fink, R. Mulhaupt and H. H. Brintzinger, eds., Springer-Verlag 1995); or in EP 103 120; EP 102 503; EP 0 231 102; EP 0 703 246; RE 33,683; U.S. Pat. Nos. 4,302,565; 5,518,973; 5,525, 678; 5,288,933; 5,290,745; 5,093,415 and 6,562,905. Examples of such catalysts include those having Group 4, 5 or 6 transition metal oxides, alkoxides and halides, or oxides, alkoxides and halide compounds of titanium, zirconium or vanadium; optionally in combination with a magnesium compound, internal and/or external electron donors (alcohols, ethers, siloxanes, etc.), aluminum or boron alkyl and alkyl halides, and inorganic oxide supports.

Conventional-type transition metal catalysts may be used. Conventional type transition metal catalysts include traditional Ziegler-Natta catalysts in U.S. Pat. Nos. 4,115,639; 4,077,904; 4,482,687; 4,564,605; 4,721,763; 4,879,359; and 4,960,741. Conventional-type transition metal catalysts may be represented by the formula: $MR_x$, where M is a metal from Groups 3 to 17, or a metal from Groups 4 to 6, or a metal from Group 4, or titanium; R is a halogen or a hydrocarbyloxy group; and x is the valence of the metal M. Examples of R include alkoxy, phenoxy, bromide, chloride and fluoride. In an embodiment, conventional-type transition metal catalyst compounds include transition metal compounds from Groups 3 to 17, or Groups 4 to 12, or Groups 4 to 6.

Conventional-type transition metal catalyst compounds based on magnesium/titanium electron-donor complexes are described in, for example, U.S. Pat. Nos. 4,302,565 and 4,302,566. Catalysts derived from Mg/Ti/Cl/THF are also contemplated, which are well known to those of ordinary skill in the art.

Suitable chromium catalysts include di-substituted chromates, such as $CrO_2(OR)_2$; where R is triphenylsilane or a tertiary polyalicyclic alkyl. The chromium catalyst system may further include $CrO_3$, chromocene, silyl chromate, chromyl chloride ($CrO_2Cl_2$), chromium-2-ethyl-hexanoate, chromium acetylacetonate ($Cr(AcAc)_3$), and the like. Illustrative chromium catalysts are further described in U.S. Pat. Nos. 3,231,550; 3,242,099; and 4,077,904.

Metallocenes are generally described throughout in, for example, 1 & 2 METALLOCENE-BASED POLYOLEFINS (John Scheirs & W. Kaminsky eds., John Wiley & Sons, Ltd. 2000); G. G. Hlatky in 181 COORDINATION CHEM. REV. 243-296 (1999) and in particular, for use in the synthesis of polyethylene in 1 METALLOCENE-BASED POLYOLEFINS 261-377 (2000). The metallocene catalyst compounds may include "half sandwich" and "full sandwich" compounds having one or more Cp ligands (cyclopentadienyl and ligands isolobal to cyclopentadienyl) bound to at least one Group 3 to Group 12 metal atom, and one or more leaving group(s) bound to the at least one metal atom. Hereinafter, these compounds will be referred to as "metallocenes" or "metallocene catalyst components."

The Cp ligands are one or more rings or ring system(s), at least a portion of which includes π-bonded systems, such as cycloalkadienyl ligands and heterocyclic analogues. The ring(s) or ring system(s) typically include atoms selected from Groups 13 to 16 atoms, or the atoms that make up the Cp ligands may be selected from carbon, nitrogen, oxygen, silicon, sulfur, phosphorous, germanium, boron and aluminum and combinations thereof, wherein carbon makes up at least 50% of the ring members. Or, the Cp ligand(s) may be selected from substituted and unsubstituted cyclopentadienyl ligands and ligands isolobal to cyclopentadienyl, non-limiting examples of which include cyclopentadienyl, indenyl, fluorenyl and other structures. Further non-limiting examples of such ligands include cyclopentadienyl, cyclopentaphenanthreneyl, indenyl, benzindenyl, fluorenyl, octahydrofluorenyl, cyclooctatetraenyl, cyclopentacyclododecene, phenanthrindenyl, 3,4-benzofluorenyl, 9-phenylfluorenyl, 8-H-cyclopent[a]acenaphthylenyl, 7H-dibenzofluorenyl, indeno[1,2-9]anthrene, thiophenoindenyl, thiophenofluorenyl, hydrogenated versions thereof (e.g., 4,5,6,7-tetrahydroindenyl, or "H$_4$Ind"), substituted versions thereof, and heterocyclic versions thereof.

In one aspect, the one or more metallocene catalyst components are represented by the formula (I):

$$Cp^A Cp^B MX_n \quad\quad\quad\quad (I).$$

The metal atom "M" of the metallocene catalyst compound, as described throughout the specification and claims, may be selected from the group consisting of Groups 3 through 12 atoms and lanthanide Group atoms in one embodiment; and selected from the group consisting of Groups 4, 5 and 6 atoms in yet another embodiment, and a Ti, Zr, Hf atoms in a further embodiment, and Zr in yet another embodiment. The groups bound the metal atom "M" such that the compounds described below in the formulas and structures are neutral, unless otherwise indicated. The Cp ligand(s) form at least one chemical bond with the metal atom M to form the "metallocene catalyst compound". The Cp ligands are distinct from the leaving groups bound to the catalyst compound in that they are not highly susceptible to substitution/abstraction reactions.

M is as described above; each X is chemically bonded to M; each Cp group is chemically bonded to M; and n is 0 or an integer from 1 to 4, and either 1 or 2 in a particular embodiment.

The ligands represented by Cp$^A$ and Cp$^B$ in formula (I) may be the same or different cyclopentadienyl ligands or ligands isolobal to cyclopentadienyl, either or both of which may contain heteroatoms and either or both of which may be substituted by a group R. In one embodiment, Cp$^A$ and Cp$^B$ are independently selected from the group consisting of cyclopentadienyl, indenyl, tetrahydroindenyl, fluorenyl, and substituted derivatives of each.

Independently, each Cp$^A$ and Cp$^B$ of formula (I) may be unsubstituted or substituted with any one or combination of substituent groups R. Non-limiting examples of substituent groups R as used in structure (I) include hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aryls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof.

More particular non-limiting examples of alkyl substituents R associated with formula (i) includes methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluoroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents R include olefins such as but not limited to olefinically unsaturated substituents including vinyl-terminated ligands, for example 3-butenyl, 2-propenyl, 5-hexenyl and the like. In one embodiment, at least two R groups, two adjacent R groups in one embodiment, are joined to form a ring structure having from 3 to 30 atoms selected from the group consisting of carbon, nitrogen, oxygen, phosphorous, silicon, germanium, aluminum, boron and combinations thereof. Also, a substituent group R group such as 1-butanyl may form a bonding association to the element M.

Each X in formula (I) is independently selected from the group consisting of: any leaving group in one embodiment; halogen ions, hydrides, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In another embodiment, X is C$_1$ to C$_{12}$ alkyls, C$_2$ to C$_{12}$ alkenyls, C$_6$ to C$_{12}$ aryls, C$_7$ to C$_{20}$ alkylaryls, C$_1$ to C$_{12}$ alkoxys, C$_6$ to C$_{16}$ aryloxys, C$_7$ to C$_{18}$ alkylaryloxys, C$_1$ to C$_{12}$ fluoroalkyls, C$_6$ to C$_{12}$ fluoroaryls, and C$_1$ to C$_{12}$ heteroatom-containing hydrocarbons and substituted derivatives thereof in a more particular embodiment; hydride, halogen ions, C$_1$ to C$_6$ alkyls, C$_2$ to C$_6$ alkenyls, $C_7$ to $C_{18}$ alkylaryls, $C_1$ to $C_6$ alkoxys, $C_6$ to $C_{14}$ aryloxys, $C_7$ to $C_{16}$ alkylaryloxys, $C_1$ to $C_6$ alkylcarboxylates, $C_1$ to $C_6$ fluorinated alkylcarboxylates, $C_6$ to $C_{12}$ arylcarboxylates, $C_7$ to $C_{18}$ alkylarylcarboxylates, $C_1$ to $C_6$ fluoroalkyls, $C_2$ to $C_6$ fluoroalkenyls, and $C_7$ to $C_{18}$ fluoroalkylaryls in yet a more particular embodiment; hydride, chloride, fluoride, methyl, phenyl, phenoxy, benzoxy, tosyl, fluoromethyls and fluorophenyls in another embodiment; $C_1$ to $C_{12}$ alkyls, $C_2$ to $C_{12}$ alkenyls, $C_6$ to $C_{12}$ aryls, $C_7$ to $C_{20}$ alkylaryls, substituted $C_1$ to $C_{12}$ alkyls, substituted $C_6$ to $C_{12}$ aryls, substituted $C_7$ to $C_{20}$ alkylaryls and $C_1$ to $C_{12}$ heteroatom-containing alkyls, $C_1$ to $C_{12}$ heteroatom-containing aryls and $C_1$ to $C_{12}$ heteroatom-containing alkylaryls in yet a more particular embodiment; chloride, fluoride, $C_1$ to $C_6$ alkyls, $C_2$ to $C_6$ alkenyls, $C_7$ to $C_{18}$ alkylaryls, halogenated $C_1$ to $C_6$ alkyls, halogenated $C_2$ to $C_6$ alkenyls, and halogenated $C_7$ to $C_{18}$ alkylaryls in a further embodiment; fluoride, methyl, ethyl, propyl, phenyl, methylphenyl, dimethylphenyl, trimethylphenyl, fluoromethyls (mono-, di- and trifluoromethyls) and fluorophenyls (mono-, di-, tri-, tetra- and pentafluorophenyls) in yet another embodiment.

In an embodiment, the metallocene catalyst compound and/or component may include those of formula (I) where $Cp^A$ and $Cp^B$ are bridged to each other by at least one bridging group, (A), such that the structure is represented by formula (II):

$$Cp^A(A)Cp^B MX_n \qquad (II)$$

These bridged compounds represented by formula (II) are known as "bridged metallocenes." $Cp^A$, $Cp^B$, M, X and n are as defined above for formula (I); and wherein each Cp ligand is chemically bonded to M, and (A) is chemically bonded to each Cp. Non-limiting examples of bridging group (A) include divalent alkyls, divalent lower alkyls, divalent substituted alkyls, divalent heteroalkyls, divalent alkenyls, divalent lower alkenyls, divalent substituted alkenyls, divalent heteroalkenyls, divalent alkynyls, divalent lower alkynyls, divalent substituted alkynyls, divalent heteroalkynyls, divalent alkoxys, divalent lower alkoxys, divalent aryloxys, divalent alkylthios, divalent lower alkyl thios, divalent arylthios, divalent aryls, divalent substituted aryls, divalent heteroaryls, divalent aralkyls, divalent aralkylenes, divalent alkaryls, divalent alkarylenes, divalent haloalkyls, divalent haloalkenyls, divalent haloalkynyls, divalent heteroalkyls, divalent heterocycles, divalent heteroaryls, divalent heteroatom-containing groups, divalent hydrocarbyls, divalent lower hydrocarbyls, divalent substituted hydrocarbyls, divalent heterohydrocarbyls, divalent silyls, divalent boryls, divalent phosphinos, divalent phosphines, divalent aminos, divalent amines, divalent ethers, divalent thioethers. Additional non-limiting examples of bridging group A include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain substituent groups R as defined above for formula (I) including halogen radicals and iron. More particular non-limiting examples of bridging group (A) are represented by $C_1$ to $C_6$ alkylenes, substituted $C_1$ to $C_6$ alkylenes, oxygen, sulfur, $R'_2C=$, $R'_2Si=$, $-Si(R')_2Si(R'_2)-$, $R'_2Ge=$, $R'P=$ (wherein "=" represents two chemical bonds), where R' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R' may be joined to form a ring or ring system. In one embodiment, the bridged metallocene catalyst component of formula (II) has two or more bridging groups (A).

Other non-limiting examples of bridging group (A) include methylene, ethylene, ethylidene, propylidene, isopropylidene, diphenylmethylene, 1,2-dimethylethylene, 1,2-diphenylethylene, 1,1,2,2-tetramethylethylene, dimethylsilyl, diethylsilyl, methyl-ethylsilyl, trifluoromethylbutylsilyl, bis (trifluoromethyl)silyl, di(n-butyl)silyl, di(n-propyl)silyl, di(i-propyl)silyl, di(n-hexyl)silyl, dicyclohexylsilyl, diphenylsilyl, cyclohexylphenylsilyl, t-butylcyclohexylsilyl, di(t-butylphenyl)silyl, di(p-tolyl)silyl and the corresponding moieties wherein the Si atom is replaced by a Ge or a C atom; dimethylsilyl, diethylsilyl, dimethylgermyl and diethylgermyl.

In another embodiment, bridging group (A) may also be cyclic, comprising, for example 4 to 10, 5 to 7 ring members in other embodiments. The ring members may be selected from the elements mentioned above, from one or more of B, C, Si, Ge, N and O in a particular embodiment. Non-limiting examples of ring structures which may be present as or part of the bridging moiety are cyclobutylidene, cyclopentylidene, cyclohexylidene, cycloheptylidene, cyclooctylidene and the corresponding rings where one or two carbon atoms are replaced by at least one of Si, Ge, N and O, in particular, Si and Ge. The bonding arrangement between the ring and the Cp groups may be either cis-, trans-, or a combination.

The cyclic bridging groups (A) may be saturated or unsaturated and/or carry one or more substituents and/or be fused to one or more other ring structures. If present, the one or more substituents are selected from the group consisting of hydrocarbyl (e.g., alkyl such as methyl) and halogen (e.g., F, Cl) in one embodiment. The one or more Cp groups which the above cyclic bridging moieties may optionally be fused to may be saturated or unsaturated and are selected from the group consisting of those having 4 to 10, more particularly 5, 6 or 7 ring members (selected from the group consisting of C, N, O and S in a particular embodiment) such as, for example, cyclopentyl, cyclohexyl and phenyl. Moreover, these ring structures may themselves be fused such as, for example, in the case of a naphthyl group. Moreover, these (optionally fused) ring structures may carry one or more substituents. Illustrative, non-limiting examples of these substituents are hydrocarbyl (particularly alkyl) groups and halogen atoms.

The ligands $Cp^A$ and $Cp^B$ of formula (I) and (II) are different from each other in one embodiment, and the same in another embodiment.

In yet another aspect, the metallocene catalyst components include mono-ligand metallocene compounds (e.g., mono cyclopentadienyl catalyst components) such as described in WO 93/08221 for example which is incorporated herein by reference.

In another aspect, the at least one metallocene catalyst component is an unbridged "half sandwich" metallocene represented by the formula (III):

$$Cp^A MQ_q X_n \qquad (III)$$

wherein $Cp^A$ is defined as for the Cp groups in (I) and is a ligand that is bonded to M; each Q is independently bonded to M; Q is also bound to $Cp^A$ in one embodiment; X is a leaving group as described above in (I); n ranges from 0 to 3, and is 1 or 2 in one embodiment; q ranges from 0 to 3, and is 1 or 2 in one embodiment. In one embodiment, $Cp^A$ is selected from the group consisting of cyclopentadienyl, indenyl, tetrahydroindenyl, fluorenyl, substituted version thereof, and combinations thereof.

In formula (III), Q is selected from the group consisting of ROO—, RO—, R(O)—, —NR—, —CR$_2$—, —S—, —NR$_2$, —CR$_3$, —SR, —SiR$_3$, —PR$_2$, —H, and substituted and unsubstituted aryl groups, wherein R is selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In another embodiment, R is selected from C$_1$ to C$_6$ alkyls, C$_6$ to C$_{12}$ aryls, C$_1$ to C$_6$ alkylamines, C$_6$ to C$_{12}$ alkylarylamines, C$_1$ to C$_6$ alkoxys, C$_6$ to C$_{12}$ aryloxys, and the like. Non-limiting examples of Q include C$_1$ to C$_{12}$ carbamates, C$_1$ to C$_{12}$ carboxylates (e.g., pivalate), C$_2$ to C$_{20}$ allyls, and C$_2$ to C$_{20}$ heteroallyl moieties.

Described another way, the "half sandwich" metallocenes above may be described as in formula (II), such as described in, for example, U.S. Pat. No. 6,069,213:

$$Cp^4M(Q_2GZ)X_n \text{ or } T(Cp^4M(Q_2GZ)X_n)_m \quad (IV)$$

wherein M, Cp$^4$, X and n are as defined above;
Q$_2$GZ forms a polydentate ligand unit (e.g., pivalate), wherein at least one of the Q groups form a bond with M, and is defined such that each Q is independently selected from the group consisting of —O—, —NR—, —CR$_2$— and —S—; G is either carbon or silicon; and Z is selected from the group consisting of R, —OR, —NR$_2$, —CR$_3$, —SR, —SiR$_3$, —PR$_2$, and hydride, providing that when Q is —NR—, then Z is selected from the group consisting of —OR, —NR$_2$, —SR, —SiR$_3$, —PR$_2$; and provided that neutral valency for Q is satisfied by Z; and wherein each R is independently selected from the group consisting of hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos, and combinations thereof. In another embodiment, R is selected from the group consisting of C$_1$ to C$_{10}$ heteroatom containing groups, C$_1$ to C$_{10}$ alkyls, C$_6$ to C$_{12}$ aryls, C$_6$ to C$_{12}$ alkylaryls, C$_1$ to C$_{10}$ alkoxys, and C$_6$ to C$_{12}$ aryloxys; n is 1 or 2 in a particular embodiment; T is a bridging group selected from the group consisting of C$_1$ to C$_{10}$ alkylenes, C$_6$ to C$_{12}$ arylenes and C$_1$ to C$_{10}$ heteroatom containing groups, and C$_6$ to C$_{12}$ heterocyclic groups; wherein each T group bridges adjacent "Cp$^4$M(Q$_2$GZ)X$_n$" groups, and is chemically bonded to the Cp$^4$ groups; m is an integer from 1 to 7; m is an integer from 2 to 6 in a more particular embodiment.

A as described above for (A) in structure (II), may be selected from the group consisting of a chemical bond, —O—, —S—, —SO$_2$—, —NR—, =SiR$_2$, =GeR$_2$, =SnR$_2$, —R$_2$SiSiR$_2$—, RP=, C$_1$ to C$_{12}$ alkylenes, substituted C$_1$ to C$_{12}$ alkylenes, divalent C$_4$ to C$_{12}$ cyclic hydrocarbons and substituted and unsubstituted aryl groups in one embodiment; and selected from the group consisting of C$_5$ to C$_8$ cyclic hydrocarbons, —CH$_2$CH$_2$—, =CR$_2$ and =SiR$_2$ in a more particular embodiment; wherein and R is selected from the group consisting of alkyls, cycloalkyls, aryls, alkoxys, fluoroalkyls and heteroatom-containing hydrocarbons in one embodiment; and R is selected from the group consisting of C$_1$ to C$_6$ alkyls, substituted phenyls, phenyl, and C$_1$ to C$_6$ alkoxys in a more particular embodiment; and R is selected from the group consisting of methoxy, methyl, phenoxy, and phenyl in yet a more particular embodiment; wherein A may be absent in yet another embodiment, in which case each R* is defined as for R$^1$-R$^{13}$; each X is as described above in (I); n is an integer from 0 to 4, and from 1 to 3 in another embodiment, and 1 or 2 in yet another embodiment; and R$^1$ through R$^{13}$ are independently selected from the group consisting of hydrogen radicals, hydrocarbyls, lower hydrocarbyls, substituted hydrocarbyls, heterohydrocarbyls, alkyls, lower alkyls, substituted alkyls, heteroalkyls, alkenyls, lower alkenyls, substituted alkenyls, heteroalkenyls, alkynyls, lower alkynyls, substituted alkynyls, heteroalkynyls, alkoxys, lower alkoxys, aryloxys, hydroxyls, alkylthios, lower alkyls thios, arylthios, thioxys, aryls, substituted aryls, heteroaryls, aralkyls, aralkylenes, alkaryls, alkarylenes, halides, haloalkyls, haloalkenyls, haloalkynyls, heteroalkyls, heterocycles, heteroaryls, heteroatom-containing groups, silyls, boryls, phosphinos, phosphines, aminos, amines, cycloalkyls, acyls, aroyls, alkylthiols, dialkylamines, alkylamidos, alkoxycarbonyls, aryloxycarbonyls, carbamoyls, alkyl- and dialkyl-carbamoyls, acyloxys, acylaminos, aroylaminos R$^1$ through R$^{13}$ may also be selected independently from C$_1$ to C$_{12}$ alkyls, C$_2$ to C$_{12}$ alkenyls, C$_6$ to C$_{12}$ aryls, C$_7$ to C$_{20}$ alkylaryls, C$_1$ to C$_{12}$ alkoxys, C$_1$ to C$_{12}$ fluoroalkyls, C$_6$ to C$_{12}$ fluoroaryls, and C$_1$ to C$_{12}$ heteroatom-containing hydrocarbons and substituted derivatives thereof in one embodiment; selected from the group consisting of hydrogen radical, fluorine radical, chlorine radical, bromine radical, C$_1$ to C$_6$ alkyls, C$_2$ to C$_6$ alkenyls, C$_7$ to C$_{18}$ alkylaryls, C$_1$ to C$_6$ fluoroalkyls, C$_2$ to C$_6$ fluoroalkenyls, C$_7$ to C$_{18}$ fluoroalkylaryls in a more particular embodiment; and hydrogen radical, fluorine radical, chlorine radical, methyl, ethyl, propyl, isopropyl, butyl, isobutyl, tertiary butyl, hexyl, phenyl, 2,6-dimethylpheyl, and 4-tertiarybutylpheyl groups in yet a more particular embodiment; wherein adjacent R groups may form a ring, either saturated, partially saturated, or completely saturated.

It is contemplated that the metallocene catalysts components described above include their structural or optical or enantiomeric isomers (racemic mixture), and may be a pure enantiomer in one embodiment.

As used herein, a single, bridged, asymmetrically substituted metallocene catalyst component having a racemic and/or meso isomer does not, itself, constitute at least two different bridged, metallocene catalyst components.

The "metallocene catalyst compound", also referred to herein as the metallocene catalyst component" may comprise any combination of any "embodiment" described herein.

Other suitable metallocenes include but are not limited to those described in U.S. Pat. Nos. 7,179,876; 7,169,864; 7,157,531; 7,129,302; 6,995,109; 6,958,306; 6,884,748;

6,689,847; 6,309,997; 6,265,338; U.S. Pat. App. Pub. No. 2007/0055028, and U.S. Pat. App. Pub. No. 2006/019925; and published PCT App. Nos. WO 97/22635, WO 00/699/22, WO 01/30860, WO 01/30861, WO 02/46246, WO 02/50088, WO 04/026921, WO 06/019494, and WO 2010/039948.

In one or more embodiments, a "mixed" catalyst system or "multi-catalyst" system may be used. A mixed catalyst system includes at least one metallocene catalyst component and at least one non-metallocene component. The mixed catalyst system may be described as a bimetallic catalyst composition or a multi-catalyst composition. As used herein, the terms "bimetallic catalyst composition" and "bimetallic catalyst" include any composition, mixture, or system that includes two or more different catalyst components, each having the same or different metal group but having at least one different catalyst component, for example, a different ligand or general catalyst structure. Examples of useful bimetallic catalysts can be found in U.S. Pat. Nos. 6,271,325; 6,300,438; and 6,417,304. The terms "multi-catalyst composition" and "multi-catalyst" include any composition, mixture, or system that includes two or more different catalyst components regardless of the metals. Therefore, terms "bimetallic catalyst composition," "bimetallic catalyst," "multi-catalyst composition," and "multi-catalyst" will be collectively referred to herein as a "mixed catalyst system" unless specifically noted otherwise.

In an embodiment, a catalyst system is introduced to the polymerization reactor, with the catalyst system comprising a catalyst selected from the group consisting of a metallocene catalyst, a Ziegler-Natta catalyst, a chromium-based catalyst, a mixed catalyst system, and any combination thereof. In embodiments, the hindered amine light stabilizer is introduced into the reactor in a catalyst system, with the catalyst system comprising a polymerization catalyst and the hindered amine light stabilizer.

The described catalyst compounds may also be combined with one or more support materials or carriers. For example, in some embodiments, the activator is contacted with a support to form a supported activator wherein the activator is deposited on, contacted with, vaporized with, bonded to, or incorporated within, adsorbed or absorbed in, or on, a support or carrier.

Support materials may include inorganic or organic support materials, such as a porous support material. Non-limiting examples of inorganic support materials include inorganic oxides and inorganic chlorides. Other carriers include resinous support materials such as polystyrene, functionalized or crosslinked organic supports, such as polystyrene divinyl benzene, polyolefins or polymeric compounds, or any other organic or inorganic support material and the like, or mixtures thereof.

The support materials may include inorganic oxides including Group 2, 3, 4, 5, 13 or 14 metal oxides, such as silica, fumed silica, alumina, silica-alumina and mixtures thereof. Other useful supports include magnesia, titania, zirconia, magnesium chloride, montmorillonite, phyllosilicate, zeolites, talc, clays, and the like. Also, combinations of these support materials may be used, for example, silica-chromium, silica-alumina, silica-titania and the like. Additional support materials may include those porous acrylic polymers described in EP 0 767 184. Other support materials include nanocomposites, as described in PCT WO 99/47598, aerogels, as described in WO 99/48605, spherulites, as described in U.S. Pat. No. 5,972,510, and polymeric beads, as described in WO 99/50311.

Support material, such as inorganic oxides, may have a surface area in the range from about 10 to about 700 m$^2$/g, a pore volume in the range from about 0.1 to about 4 cc/g, and an average particle size in the range from about 0.1 to about 1000 μm. In other embodiments, the surface area of the support may be in the range from about 50 to about 500 m$^2$/g, the pore volume is from about 0.5 to about 3.5 cc/g, and the average particle size is from about 1 to about 500 μm. In yet other embodiments, the surface area of the support is in the range from about 100 to about 1000 m$^2$/g, the pore volume is from about 0.8 to about 5.0 cc/g, and the average particle size is from about 1 to about 100 μm, or from about 1 to about 60 μm. The average pore size of the support material may be in the range from 10 to 1000 Å; or from about 50 to about 500 Å; or from about 75 to about 450 Å.

There are various methods known in the art for producing a supported activator or combining an activator with a support material. In an embodiment, the support material is chemically treated and/or dehydrated prior to combining with the catalyst compound, activator and/or catalyst system. In embodiments, the support material may have various levels of dehydration, such as may be achieved by drying the support material at temperatures in the range from about 100° C. to about 1,000° C.

In some embodiments, dehydrated silica may be contacted with an organoaluminum or alumoxane compound. In specifically the embodiment wherein an organoaluminum compound is used, the activator is formed in situ in the support material as a result of the reaction of, for example, trimethylaluminum and water.

The supported activator is formed by preparing, in an agitated, temperature and pressure controlled vessel, a solution of the activator and a suitable solvent, then adding the support material at temperatures from 0° C. to 100° C., contacting the support with the activator solution, then using a combination of heat and pressure to remove the solvent to produce a free flowing powder. Temperatures can range from 40 to 120° C. and pressures from 5 psia to 20 psia (34.5 to 138 kPa). An inert gas sweep may also be used in assist in removing solvent. Alternate orders of addition, such as slurrying the support material in an appropriate solvent then adding the activator, may be used.

In an embodiment, the weight percent of the activator to the support material is in the range from about 10 weight percent to about 70 weight percent, or in the range from about 15 weight percent to about 60 weight percent, or in the range from about 20 weight percent to about 50 weight percent, or in the range from about 20 weight percent to about 40 weight percent.

In embodiments, supported catalyst systems include those supported catalyst systems that are formed by contacting a support material, an activator and a catalyst compound in various ways under a variety of conditions outside of a catalyst feeder apparatus. Examples of conventional methods of supporting metallocene catalyst systems are described in U.S. Pat. Nos. 4,701,432; 4,808,561; 4,912,075; 4,925,821; 4,937, 217; 5,008,228; 5,238,892; 5,240,894; 5,332,706; 5,346,925; 5,422,325; 5,466,649; 5,466,766; 5,468,702; 5,529,965; 5,554,704; 5,629,253; 5,639,835; 5,625,015; 5,643,847; 5,665,665; 5,698,487; 5,714,424; 5,723,400; 5,723,402; 5,731,261; 5,759,940; 5,767,032; 5,770,664; 5,846,895; 5,939,348; 6,090,740 and PCT publications WO 95/32995, WO 95/14044, WO 96/06187 and WO 97/02297, and EP-B1-0 685 494.

The catalyst components, for example a catalyst compound, activator and support, may be fed into the polymerization reactor as a mineral oil slurry. Solids concentrations in oil may range from about 1 to about 50 weight percent, or from about 10 to about 25 weight percent.

The catalyst compounds, activators and/or optional supports used herein may also be spray dried separately or together prior to being injected into the reactor. The spray dried catalyst may be used as a powder or solid or may be placed in a diluent and slurried into the reactor. In other embodiments, the catalyst compounds and activators used herein are not supported.

In embodiments, processes may optionally use inert particulate materials as fluidization aids. These inert particulate materials may include carbon black, silica, talc, and clays, as well as inert polymeric materials. Carbon black, for example, may have a primary particle size of about 10 to about 100 nanometers, an average size of aggregate of about 0.1 to about 30 microns, and a specific surface area from about 30 to about 1500 $m^2/g$. Silica may have a primary particle size of about 5 to about 50 nanometers, an average size of aggregate of about 0.1 to about 30 microns, and a specific surface area from about 50 to about 500 $m^2/g$. Clay, talc, and polymeric materials have an average particle size of about 0.01 to about 10 microns and a specific surface area of about 3 to 30 $m^2/g$. These inert particulate materials may be used in amounts ranging from about 0.3 to about 80%, or from about 5 to about 50%, based on the weight of the final product. They are especially useful for the polymerization of sticky polymers as disclosed in U.S. Pat. Nos. 4,994,534 and 5,304,588.

Chain transfer agents, promoters, scavenging agents and other additives may be, and often are, used in the polymerization processes disclosed herein. Chain transfer agents are often used to control polymer molecular weight. Examples of these compounds are hydrogen and metal alkyls of the general formula $M^xR_y$, where M is a Group 3-12 metal, x is the oxidation state of the metal, typically 1, 2, 3, 4, 5 or 6, each R is independently an alkyl or aryl, and y is 0, 1, 2, 3, 4, 5, or 6. In some embodiments, a zinc alkyl is used, such as diethyl zinc. Typical promoters may include halogenated hydrocarbons such as $CHCl_3$, $CFCl_3$, $CH_3$—$CCl_3$, $CF_2Cl$—$CCl_3$, and ethyltrichloroacetate. Such promoters are well known to those of ordinary skill in the art and are disclosed in, for example, U.S. Pat. No. 4,988,783. Other organometallic compounds such as scavenging agents for poisons may also be used to increase catalyst activity. Examples of these compounds include metal alkyls, such as aluminum alkyls, for example, triisobutylaluminum. Some compounds may be used to neutralize static in the fluidized-bed reactor, others known as drivers rather than antistatic agents, may consistently force the static from positive to negative or from negative to positive. The use of these additives is well within the skill of one of ordinary skill in the art. These additives may be added to the circulation loops, riser, and/or downer separately or independently from the liquid catalyst if they are solids, or as part of the catalyst provided they do not interfere with the desired atomization. To be part of the catalyst solution, the additives should be liquids or capable of being dissolved in the catalyst solution.

In one embodiment of the process of the invention, the gas phase process may be operated in the presence of a metallocene-type catalyst system and in the absence of, or essentially free of, any scavengers, such as triethylaluminum, trimethylaluminum, tri-isobutylaluminum and tri-n-hexylaluminum and diethyl aluminum chloride, dibutyl zinc, and the like. By "essentially free," it is meant that these compounds are not deliberately added to the reactor or any reactor components, and if present, are present in the reactor at less than 1 ppm.

In embodiments, the reactors disclosed herein are capable of producing greater than 500 lbs of polymer per hour (227 kg/hr) to about 300,000 lbs/hr (136,000 kg/hr) or higher of polymer, preferably greater than 1000 lbs/hr (455 kg/hr), more preferably greater than 10,000 lbs/hr (4540 kg/hr), even more preferably greater than 25,000 lbs/hr (11,300 kg/hr), still more preferably greater than 35,000 lbs/hr (15,900 kg/hr), still even more preferably greater than 50,000 lbs/hr (22,700 Kg/hr) and most preferably greater than 65,000 lbs/hr (29,000 kg/hr) to greater than 150,000 lbs/hr (68,100 kg/hr).

The polymers produced by the processes described herein may be used in a wide variety of products and end-use applications. The polymers produced may include linear low density polyethylene, elastomers, plastomers, high density polyethylene, medium density polyethylene, low density polyethylene, polypropylene homopolymers and polypropylene copolymers, including random copolymers and impact copolymers.

The polymers, typically ethylene-based polymers, have a density, for example, in the range of from 0.86 g/cc to 0.97 g/cc, in another embodiment, in the range of from 0.88 g/cc to 0.965 g/cc, and, in yet another embodiment, in the range of from 0.900 g/cc to 0.96 g/cc. Density is measured in accordance with ASTM-D-1238.

In yet another embodiment, propylene-based polymers are produced. These polymers include atactic polypropylene, isotactic polypropylene, hemi-isotactic and syndiotactic polypropylene. Other propylene polymers include propylene block, random, or impact copolymers. Propylene polymers of these types are well known in the art, see for example U.S. Pat. Nos. 4,794,096; 3,248,455; 4,376,851; 5,036,034; and 5,459,117.

The polymers may be blended and/or coextruded with any other polymer. Non-limiting examples of other polymers include linear low density polyethylene produced via conventional Ziegler-Natta and/or bulky ligand metallocene catalysis, elastomers, plastomers, high pressure low density polyethylene, high density polyethylene, polypropylene, and the like.

Polymers produced by the processes disclosed herein and blends thereof may be useful in such forming operations as film, sheet, and fiber extrusion and co-extrusion as well as blow molding, injection molding and rotary molding. Films include blown or cast films formed by co-extrusion or by lamination useful as shrink film, cling film, stretch film, sealing films, oriented films, snack packaging, heavy duty bags, grocery sacks, baked and frozen food packaging, medical packaging, industrial liners, membranes, etc. in food-contact and non-food contact applications.

Polymerization processes disclosed herein may also be operated in a condensing mode, similar to those disclosed in U.S. Pat. Nos. 4,543,399; 4,588,790; 4,994,534; 5,352,749; 5,462,999; and 6,489,408, and U.S. Patent Appl. Pub. No. 2005/0137364. Condensing mode processes may be used to achieve higher cooling capacities and, hence, higher reactor productivity. In addition to condensable fluids of the polymerization process itself, including monomer(s) and co-monomer(s), other condensable fluids inert to the polymerization may be introduced to induce a condensing mode operation, such as by the processes described in U.S. Pat. No. 5,436,304.

Measurement and Control of Static

The entrainment zone is defined as any area in a reactor system above or below the dense phase zone of the reactor system. Fluidization vessels with a bubbling bed comprise two zones, a dense bubbling phase with an upper surface separating it from a lean or dispersed phase. The portion of the vessel between the (upper) surface of the dense bed and the exiting gas stream (to the recycle system) is called "freeboard." Therefore, the entrainment zone comprises the freeboard, the cycle (recycle) gas system (including piping and compressors/coolers) and the bottom of the reactor up to the top of the distributor plate. Electrostatic activity measured anywhere in the entrainment zone is termed herein "carryover static," and as such, is differentiated from the electrostatic activity measured by a conventional static probe or probes in the fluid bed.

The electrostatic activity (carryover or entrainment static) measured above the "at or near zero" level (as defined herein) on the carryover particles in the entrainment zone may correlate with sheeting, chunking or the onset of same in a polymer reaction system and may be a more reliable indicator of sheeting or a discontinuity event than electrostatic activity measured by one or more "conventional" static probes. In addition, monitoring electrostatic activity of the carryover particles in the entrainment zone may provide reactor parameters by which the amount of hindered amine light stabilizer and continuity additive, if used, may be dynamically adjusted and an optimum level obtained to reduce or eliminate the discontinuity event. In embodiments, the level of electrostatic activity in the entrainment zone is monitored, and the amount of hindered amine light stabilizer introduced into the polymerization reactor is adjusted to maintain the levels of electrostatic activity in the entrainment zone at or near zero.

If the level of electrostatic activity in the entrainment zone increases in magnitude during the course of the reaction, the amount of hindered amine light stabilizer in the reactor system may be adjusted accordingly as described further herein.

Static Probes

The static probes described herein as being in the entrainment zone include one or more of: at least one recycle line probe; at least one annular disk probe; at least one distributor plate static probe; or at least one upper reactor static probe, this latter will be outside or above the ¼ to ¾ reactor diameter height above the distributor plate of the conventional probe or probes. These probes may be used to determine entrainment static either individually or with one or more additional probes from each group mentioned above. The type and location of the static probes may be, for example, as described in U.S. Patent Appl. Pub. No. 2005/0148742.

Typical current levels measured with the conventional reactor probes range from ±0.1-10, or ±0.1-8, or ±0.1-6, or ±0.1-4, or ±0.1-2 nanoamps/cm$^2$. As with all current measurements discussed herein, these values will generally be averages over time periods, also these may represent root mean squared values (RMS), in which case they would all be positive values. However, most often, in reactors utilizing metallocene catalysts, the conventional reactor probes will register at or near zero during the beginning of or middle of a sheeting incident. By at or near zero, it is intended for either the conventional static reactor probe as well as the probes in the entrainment zone, to be a value of ≤±0.5, or ≤±0.3, or ≤±0.1, or ≤±0.05, or ≤±0.03, or ≤±0.01, or ≤±0.001 or 0 nanoamps/cm$^2$. For example, a measured value of −0.4 would be "less than" "±0.5," as would a measured value of +0.4. When static is measured with a voltage probe, typical voltage levels measured may range from ±0.1-15,000, or ±0.1-10,000 volts.

The conventional static probe may register at or near zero static or current (as defined herein), while at least one other static probe in at least one location in the entrainment zone, may register static activity or current higher than that measured by the conventional static probe (this latter may most often be at or near zero with metallocene catalyst). In this event, where the difference between the current measured by conventional static probe and the current measured by one or more other (non-conventional static probes) is ≥±0.1, or ≥±0.3, or ≥±0.5 nanoamps/cm$^2$, or greater, action will be taken to reduce or eliminate the static charge in being detected at one or more of the entrainment zone probes. Such action may be addition of a hindered amine light stabilizer according to embodiments disclosed herein (or a net increase in the presence in the reactor of a hindered amine light stabilizer according to embodiments disclosed herein), or a reduction in the catalyst feed rate, or a reduction in the gas throughput velocity, or combinations thereof. Continuity additives may also be added as discussed herein. These actions constitute means for maintaining, reducing or eliminating carryover static and reactor static at or near zero.

When one or more of the static probes discussed above begin to register static activity above or below zero, (defined as being respectively above or below "at or near zero") measures should be taken to keep the level low or to return the level of static activity to at or near zero, which we have shown will prevent, reduce or eliminate reactor continuity events. The measures contemplated include addition of a hindered amine light stabilizer. Such addition may have the effect of raising the level of a hindered amine light stabilizer in the reactor if a certain level is already present.

The total amount of the hindered amine light stabilizer described herein and any continuity additives, if used, present in the reactor will generally not exceed, for example, 500 or 250 or 200, or 150, or 125 or 100 or 90, or 80, or 70 or 60, or 50, or 40, or 30, or 20 or 10 ppmw. The total amount of hindered amine light stabilizer and any continuity additives or static control agents, if used, will be greater than 0.01, or 1, or 3, or 5, or 7, or 10, or 12, or 14, or 15, or 17, or 20 ppmw. Any of these lower limits are combinable with any upper limit given above. The hindered amine light stabilizer may be added directly to the reactor through a dedicated feed line, and/or added to any convenient feed stream, including the ethylene feed stream, the comonomer feed stream, the catalyst feed line, or the recycle line. If more than one hindered amine light stabilizer and continuity additive or static control agent is used, each one may be added to the reactor as separate feed streams, or as any combination of separate feed streams or mixtures. The manner in which the hindered amine light stabilizer is added to the reactor is not important, so long as the additive(s) are well dispersed within the fluidized bed, and that their feed rates (or concentrations) are regulated in a manner to provide minimum levels of carryover static.

The total amount of additive discussed immediately above may include a hindered amine light stabilizer from any source, such as that added with the catalyst, added in a dedicated continuity additive line, contained in any recycle material, or combinations thereof. In one embodiment, a portion of the hindered amine light stabilizer may be added to the reactor as a preventative measure before any measurable electrostatic activity, in such case, when one or more static probes register static activity above the "at or near zero" level, the amount of the hindered amine light stabilizer may be increased to return the one or more probes registering static activity, back to at or near zero.

It is also within the scope of embodiments to introduce a hindered amine light stabilizer in the catalyst mixture, inject the catalyst mixture (containing the hindered amine light stabilizer) into the reactor system, and additionally or alternatively introduce a hindered amine light stabilizer into the reactor system via a dedicated additive feed line independent of the catalyst mixture, so that a sufficient concentration of the hindered amine light stabilizer is introduced into the reactor to prevent or eliminate a reactor discontinuity event. Either of these feed schemes or both together may be employed. The hindered amine light stabilizer in the catalyst/hindered amine light stabilizer mixture and the hindered amine light stabilizer added via the separate additive feed line, may be the same or different.

In another embodiment, hindered amine light stabilizers may be added to a non-soluble or anti-solvent component to form a suspension. When added to the reactor, the hindered amine light stabilizer is thereby well dispersed in a high surface area state and may be able to coat the vessel walls and polymer particles more effectively. It is also believed that the particles are more highly charged in this state and more effective as a static driver.

Determination of optimal hindered amine light stabilizer feed rate to the reactor system is evidenced by a value of the static level at or near zero as defined herein. For example, after stabilizing the static level reading in the reactor, if additional (i.e. higher) levels of a hindered amine light stabilizer are added, and if one or more static probes in the entrainment zone of the reactor shows an increase in magnitude of static reading, this is a qualitative indication that the optimum continuity level has been exceeded. In this event, the levels of hindered amine light stabilizer may be lowered until stability of the static activity (as indicated by relatively constant readings of static activity in the one or more static probes) is again achieved, or the static activity is lowered to near zero or regains zero. Thus, dynamically adjusting the amount of the hindered amine light stabilizer to reach an optimum concentration range is desirable. By optimum concentration, we intend herein an effective amount. Therefore, an effective amount of the hindered amine light stabilizer is that amount that reduces, eliminates or achieves stability in electrostatic charge as measured by one or more static probes.

EXAMPLES

It is to be understood that while the invention has been described in conjunction with the specific embodiments thereof, the foregoing description is intended to illustrate and not limit the scope of the invention. Other aspects, advantages and modifications will be apparent to those skilled in the art to which the invention pertains.

Therefore, the following examples are put forth so as to provide those skilled in the art with a complete disclosure and description and are not intended to limit the scope of that which the inventors regard as their invention.

The following additives were used in the Examples below. A mixture of aluminum distearate and an ethoxylated amine type compound was used, which was IRGASTAT AS-990 (commercially available from Huntsman Corporation, formerly Ciba Specialty Chemicals). When such mixture was mixed with HYDROBRITE® 380 mineral oil, the resulting mixture was referred to throughout the examples as a continuity additive CA1 HYDROBRITE® is a registered trademark of Crompton Corporation.

CHIMASSORB® 944 is a high molecular weight hindered amine light stabilizer (HALS) with a 2,000-3,100 g/mole molecular weight, which has a 100-135° C. melting point. CHIMASSORB® 944 was soluble in n-hexane (41 gm/100 gram solution). A CHIMASSORB® slurry was prepared by a) pre-drying in a vacuum oven at 80° C. for about 12 hours, b) dissolving the pre-dried solid at 100° C. under agitation for up to 4 hours in HYDROBRITE® 380 oil. A 10 wt % slurry of CHIMASSORB® 944 was made and charged to the slurry feeder. The CHIMASSORB® 944 slurry is referred to throughout the example as a continuity additive CA2.

The following catalysts were used in the Examples below. XCAT® VP-100 Metallocene Catalyst is a metallocene catalyst, and a registered trademark of Univation Technologies, LLC, Houston, Tex. PRODIGY® BMC-200 Catalyst is a catalyst, which is a registered trademark of Univation Technologies, LLC, Houston, Tex.

The examples described below reference Tables 1-3 that include detailed data.

TABLE 1

| Example | 1 | 2 | 3 | 4 | 5 |
|---|---|---|---|---|---|
| Run Description | CA1 @ 40 PPM | CA2 40 PPM | CA2 @ 40 PPM | CA2 @ 20 PPM | CA2 @ 20 PPM |
| Catalyst Type | PRODIGY® BMC-200 | PRODIGY® BMC-200 | PRODIGY® BMC-200 | PRODIGY® BMC-200 | PRODIGY® BMC-200 |
| Residence Time (hrs) | 5.7 | 5.8 | 5.5 | 5.5 | 5.9 |
| Ethylene (mole %) | 70.0 | 70.0 | 70.0 | 70.0 | 70.0 |
| Hydrogen (ppm) | 1400.3 | 1401.9 | 1399.8 | 1400.5 | 1400.0 |
| Hexene-1 (mole %) | 0.4 | 0.4 | 0.4 | 0.4 | 0.3 |
| Isopentane (mole %) | 6.9 | 6.6 | 6.5 | 6.3 | 6.2 |
| $C_2$ Feed, kg/hr | 85 | 85 | 84 | 85 | 82 |
| RX Pressure, kpag | 2069 | 2068 | 2068 | 2068 | 2068 |
| Reaction Temperature ° C.) | 105.9 | 105.8 | 105.9 | 105.8 | 105.9 |
| Gas Velocity, m/s | 0.59 | 0.59 | 0.59 | 0.59 | 0.59 |
| Prod Rate, kg/h | 47 | 47 | 49 | 49 | 46 |
| PRODUCT PROPERTIES | | | | | |
| Melt Index (dg/min) | 0.138 | 0.121 | 0.166 | 0.151 | 0.133 |
| High Load Melt Index (dg/min) | 4.7 | 5.7 | 6.9 | 6.6 | 5.6 |
| MFR I21/I5 | 34.4 | 49.1 | 41.3 | 43.4 | 41.7 |
| Density (g/cc) | 0.9476 | 0.9482 | 0.9477 | 0.9479 | 0.9479 |
| CATALYST PRODUCTIVITY DATA | | | | | |
| Catalyst Productivity, kg Polymer/kg Catalyst | 7398 | 8072 | 7810 | 8036 | 8637 |

TABLE 2

| Example | 6 | 7 | 8 |
|---|---|---|---|
| Run Description | CA1 at 30 ppm | Additive not used | CA1 at 30 ppm |
| Catalyst Type | XCAT VP-100 | XCAT VP-100 | XCAT VP-100 |
| Residence Time (hrs) | 5.0 | 4.5 | 5.0 |
| Ethylene (mole %) | 63.2 | 63.2 | 63.1 |
| Hydrogen (ppm) | 292.5 | 291.5 | 291.2 |
| Hexene-1 (mole %) | 0.9 | 1.0 | 0.9 |
| Isopentane (mole %) | 3.6 | 3.6 | 3.6 |
| C2 Feed, kg/hr | 73 | 78 | 73 |
| RX Pressure, kpag | 2061 | 2063 | 2060 |
| Reactor Temperature (° C.) | 80.0 | 80.1 | 80.2 |
| Gas Velocity, m/s | 0.69 | 0.69 | 0.69 |
| Prod Rate, kg/h | 66 | 72 | 64 |
| PRODUCT PROPERTIES | | | |
| Melt Index (dg/min) | 0.966 | 1.020 | 0.890 |
| High Load Melt Index (dg/min) | 26.7 | 0.0 | 24.0 |
| MFR I21/I5 | 27.7 | 0.0 | 27.0 |
| Density (g/cc) | 0.9173 | 0.9176 | 0.9169 |
| CATALYST PRODUCTIVITY DATA | | | |
| Cat Productivity, kg Polymer/kg Catalyst | 10250 | 11167 | 9552 |

Reactor Shutdown before 3 Bed Turnovers (BTO)

TABLE 3

| Example | 9 | 10 | 11 |
|---|---|---|---|
| Run Description | CA1 at 29 ppm | CA2 at 34 ppm | CA1 at 24 ppm |
| Catalyst Type | XCAT ® VP-100 | XCAT ® VP-100 | XCAT ® VP-100 |
| Residence Time (hrs) | 4.4 | 5.1 | 2.7 |
| Ethylene (mole %) | 70.0 | 69.9 | 70.3 |
| Hydrogen (ppm) | 325.1 | 324.5 | 327.7 |
| Hexene-1 (mole %) | 1.3 | 1.3 | 1.3 |
| Isopentane (mole %) | 2.0 | 2.1 | 1.9 |
| C2 Feed, kg/hr | 86 | 86 | 105 |
| RX Pressure, kpag | 2067 | 2068 | 2050 |
| Reactor Temperature (° C.) | 79.0 | 79.1 | 80.0 |
| Gas Velocity, m/s | 0.69 | 0.69 | 0.76 |
| Prod Rate, kg/h | 73 | 62 | 86 |
| PRODUCT PROPERTIES | | | |
| Melt Index (dg/min) | 0.890 | 1.020 | 0.867 |
| High Load Melt Index (dg/min) | 29.3 | 34.7 | 26.3 |
| MFR I21/I5 | 32.8 | 34.0 | 30.4 |
| Density (g/cc) | 0.9176 | 0.9221 | 0.9168 |
| CATALYST PRODUCTIVITY DATA | | | |
| Cat Productivity, kg Polymer/kg Catalyst | 11049 | 11373 | 8092 |

TABLE 4

| Example | 12 | 13 |
|---|---|---|
| Run Description | CA1 at 24 ppm | CA2 at 25 ppm |
| Catalyst Type | XCAT ® VP-100 | XCAT ® VP-100 |
| Residence Time (hrs) | 2.6 | 2.6 |
| Ethylene (mole %) | 69.6 | 69.9 |
| Hydrogen (ppm) | 322.8 | 326.2 |
| Hexene-1 (mole %) | 1.3 | 1.3 |
| Isopentane (mole %) | 2.0 | 2.0 |
| C2 Feed, kg/hr | 105 | 97 |
| RX Pressure, kpag | 2048 | 2058 |
| Reactor Temperature (° C.) | 80.0 | 79.4 |
| Gas Velocity, m/s | 0.76 | 0.76 |
| Prod Rate, kg/h | 88 | 82 |
| PRODUCT PROPERTIES | | |
| Melt Index (dg/min) | 0.850 | 0.860 |
| High Load Melt Index (dg/min) | 26.3 | 26.8 |
| MFR I21/I5 | 31.0 | 31.2 |
| Density (g/cc) | 0.9174 | 0.9168 |
| CATALYST PRODUCTIVITY DATA | | |
| Cat Productivity, kg Polymer/kg Catalyst | 8483 | 9972 |

The polymerization reactions described herein were conducted in a continuous pilot-scale gas phase fluidized bed reactor of 0.57 meters internal diameter and 4.0 meters in bed height. The fluidized bed was made up of polymer granules. The gaseous feed streams of ethylene and hydrogen together with liquid comonomer were mixed together in a mixing tee arrangement and introduced below the reactor bed into the recycle gas line. Hexene-1 was used as comonomer. The individual flow rates of ethylene, hydrogen and comonomer were controlled to maintain fixed composition targets. The comonomer was also controlled to maintain a constant comonomer to ethylene mole ratio. The ethylene concentration was controlled to maintain a constant ethylene partial pressure. The hydrogen was controlled to maintain a constant hydrogen to ethylene mole ratio. The concentrations of all the gases were measured by an on-line gas chromatograph to ensure relatively constant composition in the recycle gas stream.

The solid catalyst XCAT® VP-100 Metallocene Catalyst was injected directly into the fluidized bed using purified nitrogen as a carrier. Its rate was adjusted to maintain a constant production rate. In the case of PRODIGY® BMC-200 Catalyst, the catalyst was injected directly into the reactor as a slurry in purified mineral oil, and the rate of the slurry catalyst feed rate was adjusted to maintain a constant production rate of polymer. The reacting bed of growing polymer particles was maintained in a fluidized state by the continuous flow of the make up feed and recycle gas through the reaction zone. A superficial gas velocity of 0.6-0.8 meters/sec was used to achieve this. The reactor was operated at a total pressure of 2,170 kPa. The reactor temperature was adjusted based depending on desired product.

The fluidized bed was maintained at a constant height at about 4 meters by withdrawing a portion of the bed at a rate equal to the rate of formation of particulate product. The rate of product formation (the polymer production rate) was in the range of 45 to about 90 kg/hour. The product was removed semi-continuously via a series of valves into a fixed volume chamber that was simultaneously vented back to the reactor, which allowed for highly efficient removal of the product while at the same time recycling a large portion of the unreacted gases back to the reactor. This product was purged to remove entrained and dissolved hydrocarbons and treated with a small steam of humidified nitrogen to deactivate any trace quantities of residual catalyst.

To maintain a constant reactor temperature, the temperature of the recycle gas entering the reactor was continuously adjusted up or down to accommodate any changes in the rate of heat generation due to the polymerization.

Examples 1 to 5

During pilot plant operation with the PRODIGY® BMC-200 Catalyst and while at 11:00 AM, a test was carried out to assess the effect of lowering the CA1 level from 40 ppm to 20 ppm based on polymer. By 21:00, the temperature measurement from the thermocouple located at the inside surface of the reactor, TI6401 bottom zone, went hotter than the average polymer fluidized bed temperature to about 110° C. and then to 117° C. (reactor bed set-point was at 105° C.). This bottom reactor zone thermocouple measurement was normally in the range of 2 to 7 degrees centigrade below the average fluidized reactor temperature. Also observed was an upper bed temperature that had more unstable behavior (oscillations above average reactor temperature). In addition, consistent with commercial operation, there was an observation that both bed static probes (xi6123 and xi6124) had negative spikes prior to seeing the bottom skin temperature excursion. Static probe xi6124 had a spike to −106 volts at about 20:28 hours, compared to its range prior to the spike of about −25 to +30 volts. The other probe, xi6123, spiked to −4.4 namps at about 20:41 hrs from its range prior to the spike of about −0.5 to +0.5 namps as shown in the FIGURE.

Polymer discharge from the reactor was not possible and required shutting down the pilot plant reactor system. Afterwards, large polymer sheets were removed from the reactor. The thick sheets of plastic that were removed showed evidence of molten flow marks as indications consistent with high extreme temperatures that occurred during this event and caused the granule polymer particles to agglomerate. The time-line for the event showed that the sheeting occurred within about 1.5 BTO of lowering the CA1 from 40 ppm to 20 ppm. One bed turnover was defined when the sum of the polymer production to equal the reactor bed weight and suggested that the reactor contained less than about 25 ppm of CA1 at that time of the sheeting shut-down event.

The results of this test example 1 indicate that the pilot plant reactor required a continuity additive to allow continuous and robust operation with the PRODIGY® BMC-200 Catalyst.

Table 1 provides detailed data for the same pilot plant operating with 40 ppm CA1 (example 1) as well as with CA2 (examples 2 to 5) when using 20 to 40 ppm (by weight of polymer production). While using CA2, the catalyst productivity of the PRODIGY® BMC-200 Catalyst was about 5 to 15% higher compared to operating with CA1.

Good operability was observed with CA2 while operating with the PRODIGY® BMC-200 Catalyst at the 20 and 40 ppm of CA2.

Examples 6 to 8

While operating with the metallocene catalyst (XCAT® VP-100 Metallocene Catalyst) and while producing a low density polymer, examples 6 to 8 (Table 2) compare the pilot plant operation with versus without using CA1 continuity additive. Examples 6 & 8, while using CA1 show stable reactor operation without temperature excursions and without the formation of sheets and chunks. However, example 7, while running without CA1, resulted in reactor temperature excursions and the formation of two chunks that caused a reactor shut-down. The reactor needed to be shut-down and opened to allow removal of the polymer chunks from the reactor. Similar to example 1 above with PRODIGY® BMC-200 Catalyst, examples 6 to 8 show also that the XCAT® VP-100 Catalyst also required the use of continuity additive to provide good reactor operation and that the continuity additive prevented the formation of chunks and polymer sheets and the resulting reactor shut-downs. The above-described reactor shut-down occurred about three bed-turnovers after the time that the CA1 feed to the reactor was shut-off One bed turnover was defined when the sum of the polymer production was equal to the reactor bed weight. After three bed-turnovers, the polymer in the reactor was essentially free of any remaining CA1.

Examples 9 to 13

Tables 3 and 4 provides detailed data for the same pilot plant operating with 30 ppm CA1 (examples 9, 11 or 12) as well as with CA2 (examples 10 and 13) when using about 24 to 25 ppm (by weight of polymer production).

Examples 9 and 10 were carried out at low polymer production rate as defined by high reactor residence time and showed good operation without sheeting and without temperature excursions while feeding CA2 to the reactor. Reactor residence time was defined as the reactor bed weight (kg) divided by the polymer production rate (kg/hr). The productivity of the XCAT® VP-100 Catalyst was about 3% higher when using the CA2 at 34 ppm compared to the use of CA1 (example 10) at 29 ppm.

Examples 11 and 12 in Tables 3 and 4 showed higher polymer production rate operation, or lower residence time operation while using CA1 at 24 ppm. Example 13 in Tables 3 and 4 show the results for operation with CA2 at 25 ppm while also operating at similarly low reactor residence time operation as examples 11 and 12. In this case, example 13, while using CA2, showed that the productivity of the XCAT® VP-100 Catalyst was greater than 10% higher compared to operation with CA1 and also maintained good reactor operation without the formation of polymer chunks and prevention of reactor temperature excursions.

Examples 10 and 13 showed that good reactor operability was demonstrated with CA2 under LD (Low Density) conditions using the XCAT® VP-100 Catalyst.

Examples 1 to 13 showed that both PRODIGY® Bimodal Catalysts (BMC-200) and XCAT® VP-100 Catalysts required co-feeding of a continuity additive (CA) to achieve good operability in reactors. The examples also showed that the use of CA2 provided good reactor operation with either of these catalysts as well as provided improvements to the catalyst productivity.

Example 14

Catalyst Preparation

The preparation of the supported metallocene catalyst was described in Comparative Example 1, "Preparation of Catalyst A" in U.S. Pat. No. 7,354,880B2.

Polymerization Process

A 2 liter autoclave reactor under nitrogen purge was charged with 0.18 mmol of tri-isobutylaluminum (TIBAL), following by 20 c.c. of 1-hexene, various additives, and comonomer and 800 c.c. of isobutane diluent. The contents of the reactor were heated to 80.degree. C., after which, 100 mg of the supported metallocene catalyst above was pushed into the reactor using ethylene. Total reactor pressure was maintained at 325 psig using ethylene. The reactor temperature was kept at 85.degree. C., and the polymerization was allowed to proceed for 40 minutes. Reactor was cooled, and ethylene and isobutane were vented off. The polymer was collected and dried. It was weighed to obtain the yield.

Reactor Fouling Index

The fouling index in the Table 5 below illustrated operability of the catalyst. The higher the value the greater the fouling observed. A Fouling Index of zero means substantially no or no visible fouling observed. A Fouling Index of 1 was indicative of light fouling, where a very light partial coating of polymer on the stirrer blade and no reactor body sheeting. A Fouling Index of 2 was indicative of more than light fouling, where the stirrer blades had a heavier, painted-like. Coating of polymer and/or reactor body wall had some sheeting in a band of 1 to 2 inches wide on the reactor wall. A Fouling Index of 3 was considered medium fouling, where the stirrer blade had a thicker, latex-like coating, some soft chunks in the reactor, and/or some reactor body sheeting with a band of 2 to 3 inch wide on the reactor wall. A Fouling Index of 4 was evident of more than medium fouling, where the stirrer had a thick, latex-like coating, some harder chunks/balls of polymer, and/or the reactor body wall sheeting band was larger than 3 inches wide.

Additives

CHIMASSORB® 944 and CHIMASSORB® 2020 are hindered amine light stabilizers. Phenolic Primary Antioxident Irgonox 1010, Irgonox 1330 and Irgonox 3114 are commercial products from BASF Corp. Lupasol FG, a homopolymeric polyethylene imine, is branched spherical polyamines. It is also from BASF Corp. CA1 is as described above. The summary of the various additives tested in slurry polymerization reactor are listed in the Table 5 below.

TABLE 5

| Examples | Additive Name | Additive mg for 100 mg Cat. | Polymer Yield, g | Cat Activity, gPE/gCat/hr | Reactor Fouling Index |
|---|---|---|---|---|---|
| Comparative | None | 0 | 277.6 | 4161 | 2 |
| Inventive | CHIMASSORB ® 944 | 2.5 | 255.2 | 3818 | 1 |
| Inventive | CHIMASSORB ® 944 | 5 | 252.4 | 3786 | 0 |
| Inventive | CHIMASSORB ® 944 | 12 | 260.2 | 3900 | 1 |
| Inventive | CHIMASSORB ® 2020 | 5 | 220.3 | 3305 | 1 |
| Comparative | Lupasol FG | 2.5 | 250.5 | 3756 | 1 |
| Comparative | Lupasol FG | 5 | 190.1 | 2849 | 0 |
| Comparative | Lupasol FG | 12 | 76.5 | 1148 | 0 |
| Comparative | CA1 | 1.3 | 284.7 | 4271 | 1 |
| Comparative | CA1 | 4.4 | 212.3 | 3197 | 0 |
| Comparative | Irgonox 1010 | 5 | 174.2 | 2612 | 1 |
| Comparative | Irgonox 1330 | 5 | 195.9 | 2957 | 2 |
| Comparative | Irgonox 3114 | 5 | 72.7 | 1052 | 1 |

The hindered amine light stabilizers as reactor additives reduced or minimized the reactor fouling and had less impact on the catalyst activity.

As described above, embodiments disclosed herein may provide continuity additives comprising hindered amine light stabilizer, for use in polymerization reactors, such as a gas-phase reactor for the production of polyolefins. Use of continuity additives according to embodiments disclosed herein may advantageously provide for prevention, reduction, or reversal of sheeting and other discontinuity events. Continuity additives according to embodiments disclosed herein may also provide for charge dissipation or neutralization without a negative effect on polymerization catalyst activity, as is commonly found to occur with conventional static control agents.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention.

While compositions, methods, and processed are described herein in terms of "comprising," "containing," "having," or "including" various components or steps, the compositions and methods can also "consist essentially of" or "consist of" the various components and steps. The phrases, unless otherwise specified, "consists essentially of" and "consisting essentially of" do not exclude the presence of other steps, elements, or materials, whether or not, specifically mentioned in this specification, so long as such steps, elements, or materials, do not affect the basic and novel characteristics of the invention, additionally, they do not exclude impurities and variances normally associated with the elements and materials used.

For the sake of brevity, only certain ranges are explicitly disclosed herein. However, ranges from any lower limit may be combined with any upper limit to recite a range' not explicitly recited, as well as, ranges from any lower limit may be combined with any other lower limit to recite a range not explicitly recited, in the same way, ranges from any upper limit may be combined with any other upper limit to recite a range not explicitly recited.

All priority documents are herein fully incorporated by reference for all jurisdictions in which such incorporation is permitted and to the extent such disclosure is consistent with the description of the present invention. Further, all documents and references cited herein, including testing procedures, publications, patents, journal articles, etc. are herein fully incorporated by reference for all jurisdictions in which such incorporation is permitted and to the extent such disclosure is consistent with the description of the present invention.

While the invention has been described with respect to a number of embodiments and examples, those skilled in the art, having benefit of this disclosure, will appreciate that other embodiments can be devised which do not depart from the scope and spirit of the invention as disclosed herein. Although individual embodiments are discussed, the invention covers all combinations of all those embodiments.

What is claimed is:

1. A continuous gas phase polymerization process, comprising:
   polymerizing an olefin to form an olefin-based polymer in a polymerization reactor; and
   introducing a hindered amine light stabilizer to the polymerization reactor, wherein the hindered amine light stabilizer comprises poly[[6-[(1,1,3,3-tetramethylbutyl)amino]-1,3,5-triazine-2,4-diyl][2,2,6,-6-tetramethyl-4-piperidinyl)imino]-1,6-hexanediyl[2,2,6,6-tetramethyl-4-piperidinyl)imino]]).

2. The polymerization process of claim 1, wherein the hindered amine light stabilizer is introduced to the reactor in an amount ranging from about 0.01 ppmw to about 500 ppmw, based on polymer production rate.

3. The polymerization process of claim 1, wherein the hindered amine light stabilizer comprises a molecular weight from about 100 g/mole to about 10,000 g/mole.

4. The polymerization process of claim 1, wherein the hindered amine light stabilizer comprises a hindered amine light stabilizer and a liquid selected from the group consisting of a mineral oil, an aromatic hydrocarbon, an aliphatic hydrocarbon, and any combination thereof.

5. The polymerization process of claim 1, wherein the hindered amine light stabilizer is introduced to the reactor in a composition comprising the hindered amine light stabilizer and an additional continuity additive selected from the group consisting of a carboxylate metal salt, an ethoxylated amine, and combinations thereof.

6. The polymerization process of claim 1, further comprising introducing a catalyst system to the polymerization reactor, the catalyst system comprising a catalyst selected from the group consisting of a metallocene catalyst, a Ziegler-Natta catalyst, a chromium-based catalyst, a mixed catalyst system, and any combination thereof.

7. The polymerization process of claim 6, wherein the mixed catalyst system is a bimetallic catalyst system.

8. The polymerization process of claim 1, wherein the hindered amine light stabilizer is introduced into the reactor in a catalyst system, the catalyst system comprising a polymerization catalyst and the hindered amine light stabilizer.

9. The polymerization process of claim 1, wherein the polymerization reactor comprises a gas-phase reactor.

10. The polymerization process of claim 1, wherein the olefin comprises a monomer selected from the group consisting of ethylene, propylene, and any combination thereof.

11. A process for copolymerizing ethylene and an alpha olefin in a gas phase reactor utilizing a metallocene catalyst, activator and support, comprising: combining reactants comprising ethylene and a monomer selected from the group consisting of 1-butene, 1-hexene, 4-methylpent-1-ene, 1-octene, and any combination thereof in the presence of a metallocene catalyst, an activator and a support; monitoring static in the gas phase reactor by a probe selected from the group consisting of a recycle line static probe, an upper bed static probe, an annular disk static probe, a distributor plate static probe, and any combination thereof; maintaining the static at a desired level by use of a hindered amine light stabilizer, the hindered amine light stabilizer present in the gas phase reactor in the range from about 0.01 ppmw to about 500 ppmw, based on the weight of polymer produced in the process.

12. A catalyst system comprising: a polymerization catalyst comprising a mixed catalyst, the mixed catalyst comprising at least one metallocene component and at least one non-metallocene catalyst component; and a hindered amine light stabilizer.

13. The catalyst system of claim 12, further comprising an activator and a support, wherein the polymerization catalyst and the activator are supported by the support.

14. A continuous gas phase polymerization process, comprising: polymerizing an olefin to form an olefin-based polymer in a polymerization reactor; and introducing a hindered amine light stabilizer to the polymerization reactor, wherein the hindered amine light stabilizer comprises a hindered amine light stabilizer of the following formula:

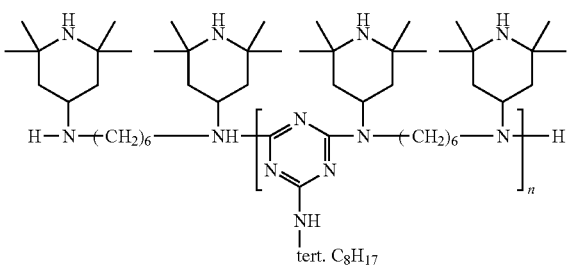

wherein n is molecular weight.

15. The polymerization process of claim 14, wherein the hindered amine light stabilizer is introduced to the reactor in an amount ranging from about 0.01 ppmw to about 500 ppmw, based on polymer production rate.

16. A continuous gas phase polymerization process, comprising: polymerizing an olefin to form an olefin-based polymer in a polymerization reactor; and introducing a hindered amine light stabilizer to the polymerization reactor, wherein the polymerization reactor comprises a fluidized bed reactor, an entrainment zone, a catalyst feed for introducing a catalyst system capable of producing the polymer, and a hindered amine light stabilizer feed for the feeding of the hindered amine light stabilizer independently of the catalyst mixture, the polymerizing comprising contacting the olefin with the catalyst system under polymerization conditions in the fluidized bed reactor.

17. The polymerization process of claim 16, further comprising:
   monitoring a level of electrostatic activity in the entrainment zone; and adjusting the amount of the hindered amine light stabilizer introduced into the polymerization reactor to maintain the levels of electrostatic activity in the entrainment zone at or near zero.

18. The polymerization process of claim 16, wherein the catalyst system comprises a metallocene catalyst.

19. The polymerization process of claim 16, wherein the hindered amine light stabilizer is introduced to the reactor in an amount ranging from about 0.01 ppmw to about 500 ppmw, based on polymer production rate.

* * * * *